(12) United States Patent
Seong et al.

(10) Patent No.: US 12,695,985 B2
(45) Date of Patent: Jul. 28, 2026

(54) CAMERA MODULE

(71) Applicant: LG INNOTEK CO., LTD., Seoul (KR)

(72) Inventors: Dong Hyun Seong, Seoul (KR); Eun Mi Kim, Seoul (KR); Jang Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 72 days.

(21) Appl. No.: 18/865,095

(22) PCT Filed: May 11, 2023

(86) PCT No.: PCT/KR2023/006427
§ 371 (c)(1),
(2) Date: Nov. 12, 2024

(87) PCT Pub. No.: WO2023/219444
PCT Pub. Date: Nov. 16, 2023

(65) Prior Publication Data
US 2025/0317650 A1     Oct. 9, 2025

(30) Foreign Application Priority Data
May 11, 2022     (KR) ........................ 10-2022-0057602

(51) Int. Cl.
*H04N 23/67* (2023.01)
*G02B 27/64* (2006.01)
(Continued)

(52) U.S. Cl.
CPC ............ *H04N 23/67* (2023.01); *G02B 27/64* (2013.01); *G02B 27/646* (2013.01); *G03B 3/00* (2013.01);
(Continued)

(58) Field of Classification Search
CPC ...... H04N 23/665; H04N 23/67; H04N 23/68; H04N 23/6812; G03B 3/00; G03B 5/00;
(Continued)

(56) References Cited

U.S. PATENT DOCUMENTS 11,036,026 B2     6/2021   Pang et al.
11,249,146 B2     2/2022   Heo
(Continued)

FOREIGN PATENT DOCUMENTS

KR     10-2009-0006117 A     1/2009
KR         10-1664886 B1     10/2016
(Continued)

OTHER PUBLICATIONS

International Search Report dated Aug. 18, 2023 in International Application No. PCT/KR2023/006427.

*Primary Examiner* — Lin Ye
*Assistant Examiner* — Chriss S Yoder, III
(74) *Attorney, Agent, or Firm* — SALIWANCHIK, LLOYD & EISENSCHENK

(57) ABSTRACT

A camera module according to an embodiment includes: a position sensor unit including a first sensor unit and a second sensor unit; and a control unit connected to the first and second sensor units and configured to obtain position information based on a plurality of output signals of the first and second sensor units, wherein the first sensor unit includes a plurality of first input terminals and a plurality of first output terminals, wherein the second sensor unit includes a plurality of second input terminals and a plurality of second output terminals, and wherein the control unit is connected to both the plurality of first output terminals and the plurality of second output terminals and obtains the position information through a selective operation based on the plurality of output signals of the first and second sensor units received through
(Continued)

the plurality of first output terminals and the plurality of second output terminals.

20 Claims, 13 Drawing Sheets

(51) Int. Cl.

| | |
|---|---|
| *G03B 3/00* | (2021.01) |
| *G03B 5/00* | (2021.01) |
| *G03B 17/12* | (2021.01) |
| *H04N 23/60* | (2023.01) |
| *H04N 23/68* | (2023.01) |

(52) U.S. Cl.
CPC .............. *G03B 5/00* (2013.01); *G03B 17/12* (2013.01); *H04N 23/665* (2023.01); *H04N 23/68* (2023.01); *H04N 23/6812* (2023.01); *G03B 2205/0007* (2013.01)

(58) Field of Classification Search
CPC ....................... G03B 17/12; G03B 2205/0007; G02B 27/64; G02B 27/646
See application file for complete search history.

(56) References Cited

U.S. PATENT DOCUMENTS

| | | | | |
|---|---|---|---|---|
| 11,265,482 | B2 * | 3/2022 | Yu | G01D 5/145 |
| 11,397,308 | B2 | 7/2022 | Kim et al. | |
| 2009/0177436 | A1 * | 7/2009 | Yoshida | G01D 5/145 |
| | | | | 324/207.2 |
| 2021/0215905 | A1 * | 7/2021 | Kim | G02B 7/28 |
| 2023/0359108 | A1 * | 11/2023 | Bang | H04N 23/67 |
| 2025/0020977 | A1 * | 1/2025 | Lee | H04N 23/00 |
| 2025/0047962 | A1 * | 2/2025 | Jun | G03B 5/00 |

FOREIGN PATENT DOCUMENTS

| | | | |
|---|---|---|---|
| KR | 10-2019-0059101 | A | 5/2019 |
| KR | 10-2019-0115624 | A | 10/2019 |
| KR | 10-2019-0129432 | A | 11/2019 |
| KR | 10-2021-0071289 | A | 6/2021 |
| KR | 10-2021-0117014 | A | 9/2021 |

* cited by examiner

CAMERA MODULE

CROSS-REFERENCE TO RELATED APPLICATIONS

This application is the U.S. national stage application of International Patent Application No. PCT/KR2023/006427, filed May 11, 2023, which claims the benefit under 35 U.S.C. § 119 of Korean Application No. 10-2022-0057602, filed May 11, 2022, the disclosures of each of which are incorporated herein by reference in their entirety.

TECHNICAL FIELD

An embodiment relates to a camera module.

BACKGROUND ART

A camera module performs a function of capturing a subject and saving it as an image or video, and is installed in mobile terminals such as mobile phones, laptops, drones, vehicles, etc.

Meanwhile, an ultra-small camera module is built into in a portable device such as smartphones, tablet PCs, and laptops, and these camera modules can perform an auto focus (AF) function that automatically adjusts a distance between an image sensor and a lens to align a focal length of the lens.

The auto focus function is an essential function for clearly capturing still images or videos within a camera module. The auto focus function is provided by detecting a position of a lens barrel equipped with a coil using a position sensor, and providing a driving signal to a driving unit according to the detected position of the lens barrel and an input target position. Accordingly, a driving force is generated between a magnet of the driving unit and a coil mounted on the lens barrel, and the auto focus function is performed as a position of the lens barrel moves to a focus position.

However, a conventional camera module detects the position of the lens barrel using one position sensor. At this time, a detection signal output from the position sensor includes ambient noise. Therefore, the conventional camera module has difficulty in detecting an exact position of the lens barrel, and thus have limitations in moving the lens barrel to the exact position.

In addition, a stroke is increasing with the recent technological development of camera modules. Accordingly, there is a problem in that it is impossible to detect the exact position of an entire stroke range of a camera module with a long stroke with only one position sensor.

(Patent Document 1) KR 10-1664886 B

DISCLOSURE

Technical Problem

The embodiment provides a camera module capable of increasing a position detection range and a method of operating the same.

In addition, the embodiment provides a camera module capable of improving position accuracy and a method of operating the same.

In addition, the embodiment provides a camera module including a position detection circuit applicable to various camera usage environments and a method of operating the same.

In addition, the embodiment provides a camera module that can use multiple detection signals output from multiple position sensors individually and in combination, and a method of operating the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera module according to an embodiment comprises: a position sensor unit including a first sensor unit and a second sensor unit; and a control unit connected to the first and second sensor units and configured to obtain position information based on a plurality of output signals of the first and second sensor units, wherein the first sensor unit includes a plurality of first input terminals and a plurality of first output terminals, wherein the second sensor unit includes a plurality of second input terminals and a plurality of second output terminals, and wherein the control unit is connected to both the plurality of first output terminals and the plurality of second output terminals and obtains the position information through a selective operation based on the plurality of output signals of the first and second sensor units received through the plurality of first output terminals and the plurality of second output terminals.

In addition, the plurality of first output terminals of the first sensor unit include a first-first output terminal outputting a first-first output signal having a first polarity, and a first-second output terminal outputting a first-second output signal having a second polarity opposite to the first polarity, and the plurality of second output terminals of the second sensor unit include a second-first output terminal outputting a second-first output signal having the first polarity, and a second-second output terminal outputting a second-second output signal having the second polarity.

In addition, the control unit includes a port unit connected to the plurality of first output terminals and the plurality of second output terminals, and the port unit includes: a first port connected to the first-first output terminal and receiving the first-first output signal, a second port connected to the first-second output terminal and receiving the first-second output signal, a third port connected to the second-first output terminal and receiving the second-first output signal, and a fourth port connected to the second-second output terminal and receiving the second-second output signal.

In addition, the control unit includes: a multiplexer connected to the port unit and switching the plurality of output signals received through the connected ports; an amplifier receiving the plurality of output signals of the first and second sensor units through one of the port unit and the multiplexer, and differentially amplifying at least one of the received plurality of output signals; and an analog-to-digital converter connected to the amplifier and converting an output signal of the amplifier into a digital signal.

In addition, the amplifier includes an inverting terminal and a non-inverting terminal for receiving a plurality of output signals of the first and second sensor units, the inverting terminal includes first and second inverting terminals, and the non-inverting terminal includes first and second non-inverting terminals, and the amplifier differentially amplifies a first addition value obtained by adding signals received through the first and second inverting terminals, and a second addition value obtained by adding signals received through the first and second non-inverting terminals.

In addition, the multiplexer includes: a first multiplexer connected to the first port and configured to switch the first-first output signal received through the first port to one of the first inverting terminal and the first non-inverting terminal of the amplifier; and a second multiplexer connected to the first port and configured to switch the second-second output signal received through the fourth port to any one of the first inverting terminal and the first non-inverting terminal of the amplifier.

In addition, the second inverting terminal of the amplifier is connected to the third port and receives the second-first output signal, and the second non-inverting terminal of the amplifier is connected to the second port and receives the first-second output signal.

In addition, the multiplexer includes: a third multiplexer connected to the third port and configured to switch the second-first output signal received through the third port to the second inverting terminal of the amplifier; and a fourth multiplexer connected to the second port and configured to switch the first-second output signal received through the second port to the second non-inverting terminal of the amplifier.

In addition, in a first condition, the first multiplexer outputs the first-first output signal to the first inverting terminal of the amplifier, and the second multiplexer outputs the second-second output signal to the first non-inverting terminal of the amplifier, and wherein, in a second condition different from the first condition, the first multiplexer outputs the first-first output signal to the first non-inverting terminal of the amplifier, and the second multiplexer outputs the second-second output signal to the first inverting terminal of the amplifier.

In addition, the amplifier amplifies a difference value between the first addition value and the second addition value and outputs the difference value, wherein, in the first condition, the first addition value is an addition value of the first-first output signal and the second-first output signal, and the second addition value is an addition value of the first-second output signal and the second-second output signal, and wherein, in the second condition, the first addition value is an addition value of the second-first output signal and the second-second output signal, and the second addition value is an addition value of the first-first output signal and the first-second output signal.

Effects of the Invention

The embodiment includes a plurality of sensor units. The plurality of sensor units may be position detection sensors detecting the position of the lens module. The embodiment detects a position of the lens module using the plurality of sensor units. Through this, the embodiment can expand a detection range in response to a long stroke of the lens module. Accordingly, the embodiment can improve the position detection accuracy of the lens module. Through this, the embodiment can improve the control accuracy of the lens module. Therefore, the embodiment can improve the operation reliability of the camera module.

In addition, each of the plurality of sensor units includes a plurality of output terminals. In addition, the plurality of output terminals are not directly connected to each other. Specifically, the plurality of output terminals are individually connected to different ports of the control unit.

Therefore, the embodiment can apply an optimal position detection condition according to an usage environment of the camera module.

Specifically, the embodiment can detect a position of the lens module using a first differential amplification signal that differentially amplifies a subtraction value of the output signals of the first sensor unit and the output signals of the second sensor unit under a first condition. In addition, the embodiment can detect a position of the lens module using a second differential amplification signal that differentially amplifies the addition value of the output signals of the first sensor unit and the output signals of the second sensor unit under a second condition. In addition, the embodiment can detect a position of the lens module using a third differential amplification signal that differentially amplifies a subtraction value of the output signals of the first sensor unit under the third condition. In addition, the embodiment can detect a position of the lens module using a fourth differential amplification signal that differentially amplifies a subtraction value of the output signals of the second sensor unit under a fourth condition.

At this time, a condition may be determined according to the usage environment of the camera module. For example, a form of noise (e.g., common mode noise) transmitted to the camera module may vary depending on an usage location of the camera module or surrounding structures. In addition, the embodiment can determine one of the first condition and the second condition based on an current usage environment to provide a detection signal that is strong against noise. Accordingly, the embodiment can improve the position detection accuracy of the lens barrel.

In addition, the embodiment can simplify a process of manufacturing the camera module without forming a connection line on a circuit board for directly connecting a plurality of sensor units to each other. Furthermore, the embodiment can improve the product yield.

DESCRIPTION OF DRAWINGS

FIG. 5 is a view explaining a connection relationship of a position sensor unit according to an embodiment.

FIG. 6 is a view showing a connection relationship of a position sensor unit of a comparative example compared to an embodiment.

FIG. 7 is a view explaining a connection relationship between a position sensor unit and a control unit according to an embodiment.

5

Figure 12:
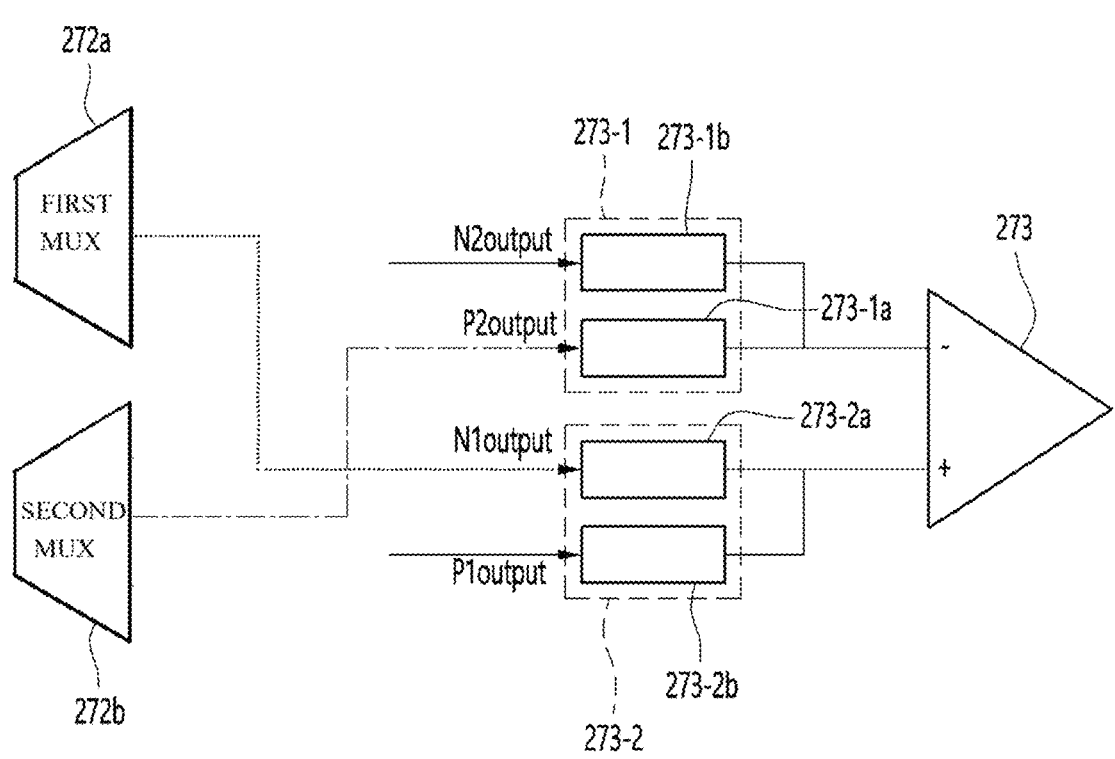

FIG. 12 is a view explaining a switching state of a multiplexer and an input signal of an amplifier in a second condition.

Figure 13:
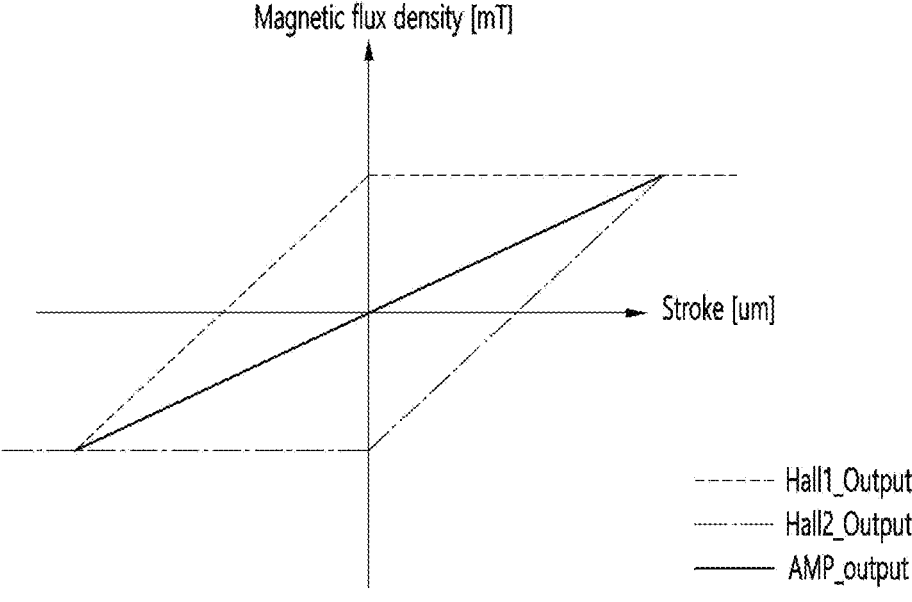

FIG. 13 is a view explaining an output signal of an amplifier of FIG. 12.

Figure 14:
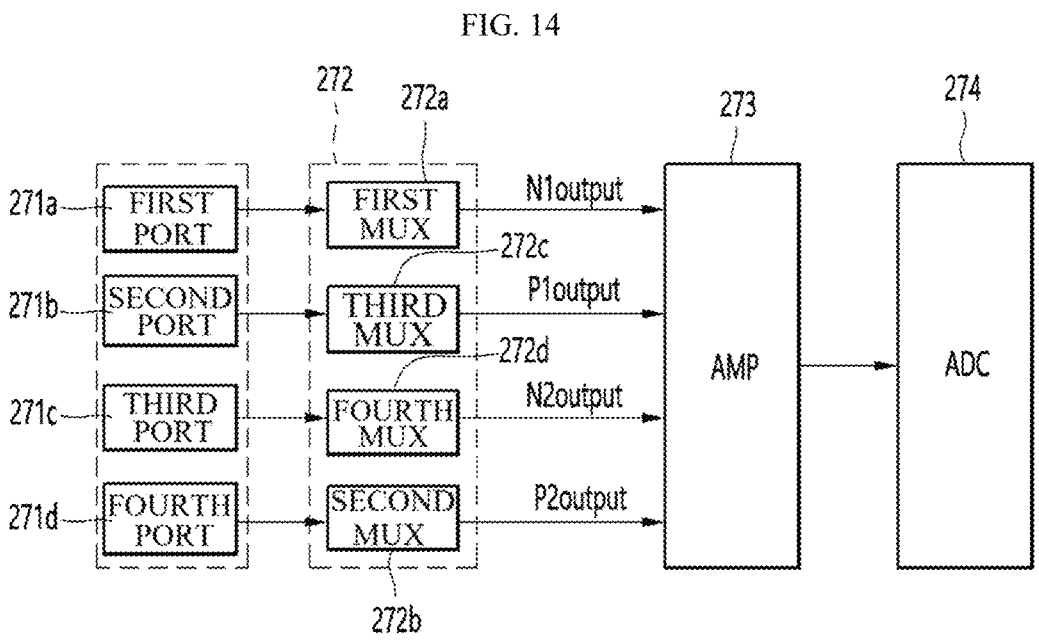

FIG. 14 is a block diagram showing a detailed configuration of a control unit of a second embodiment.

Figure 15:
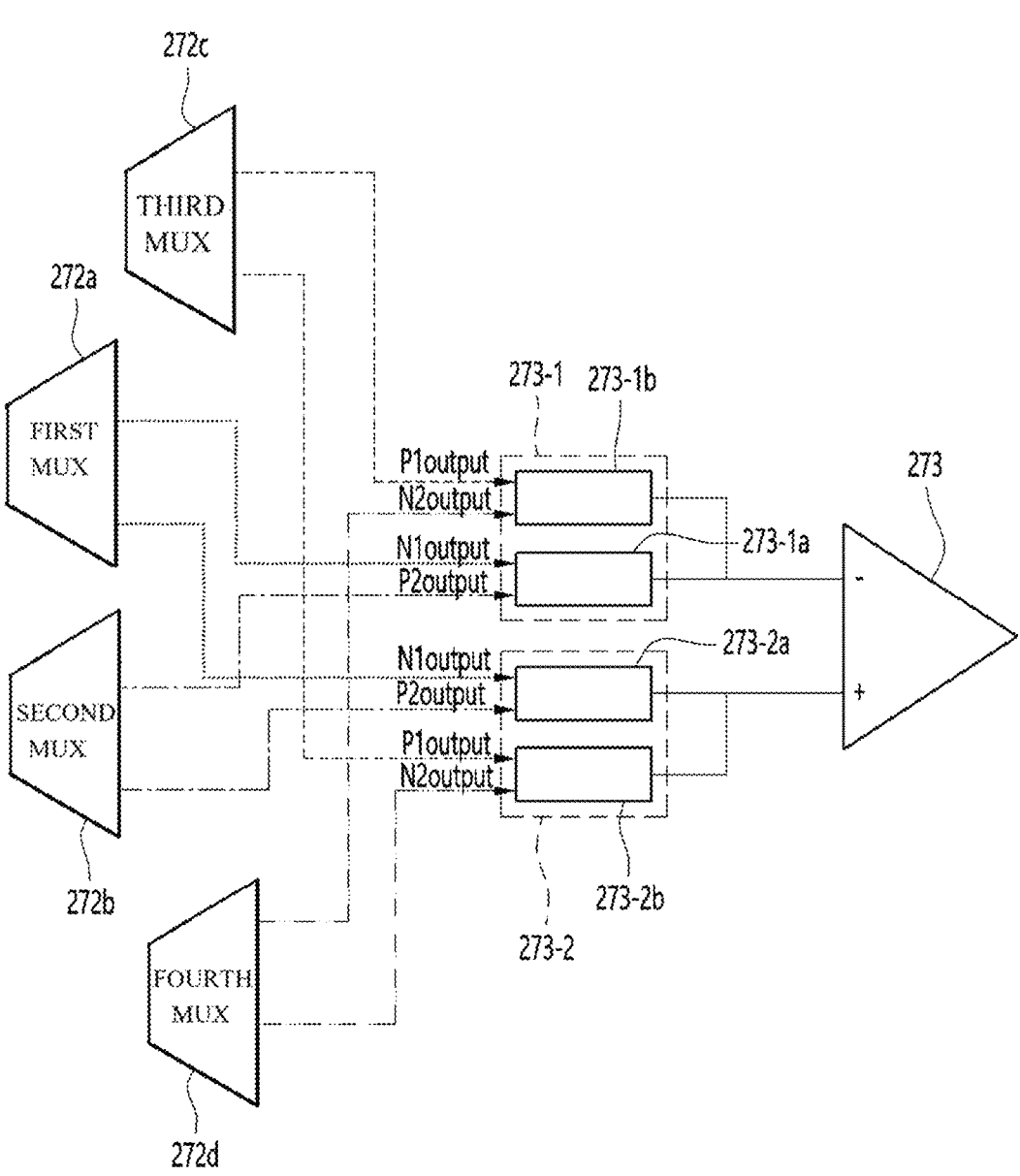

FIG. 15 is a view for explaining a connection relationship between a multiplexer and an amplifier of a control unit of FIG. 14.

Figure 16:
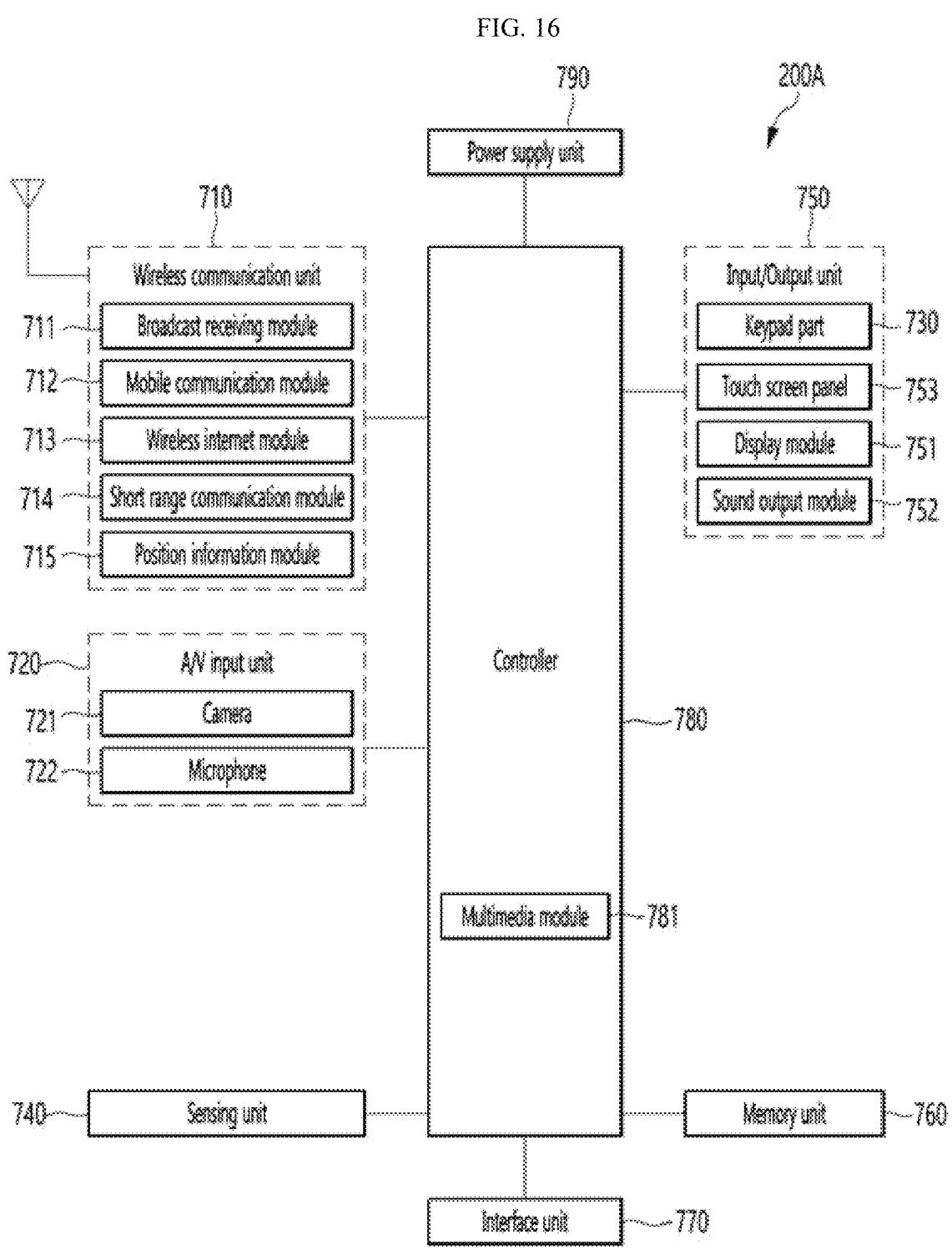

FIG. 16 is a perspective view of an optical device according to an embodiment.

Figure 17:
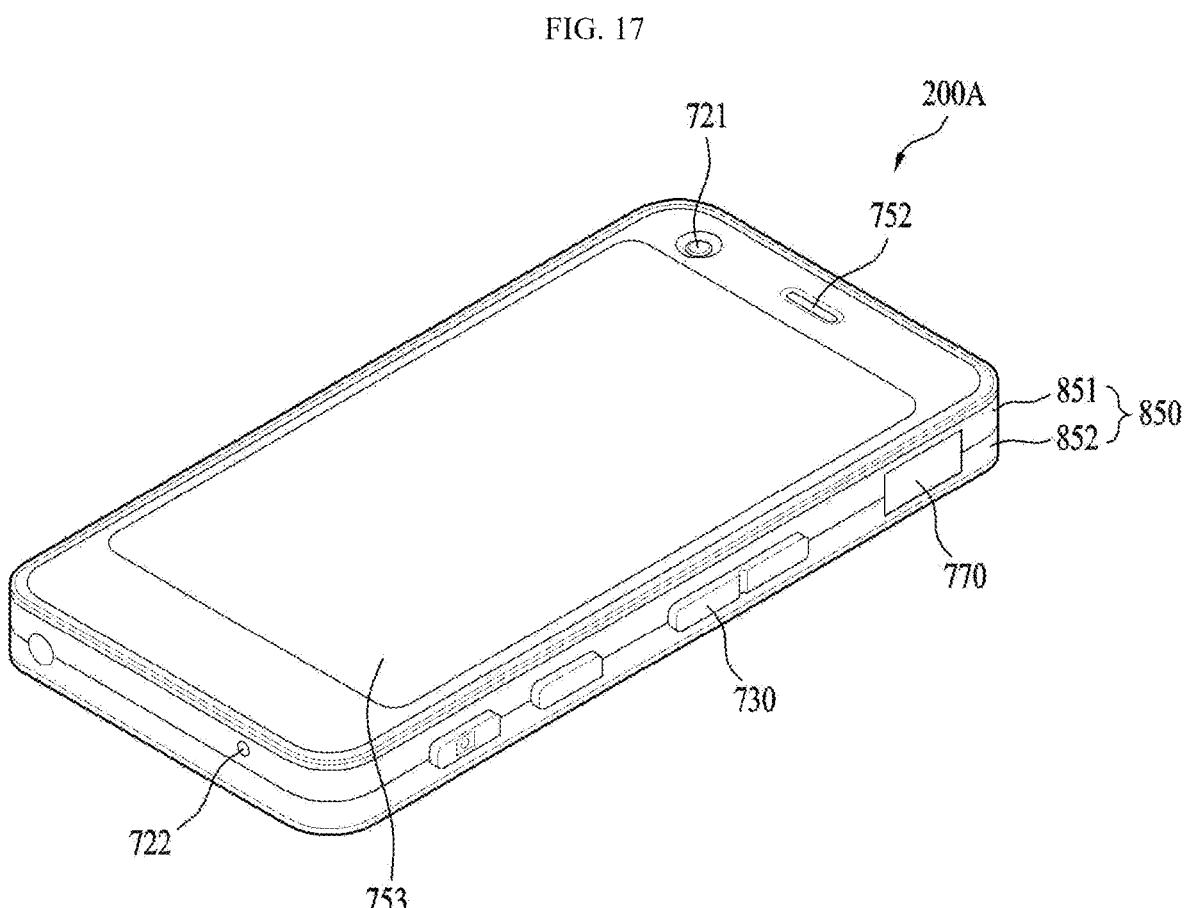

FIG. 17 is a configuration diagram of the optical device illustrated in FIG. 16.

BEST MODE

Hereinafter, embodiments of the present disclosure will be described in detail with reference to the accompanying drawings.

However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements. Furthermore, when expressed as "on (over)" or "under (below)", it may include not only an upper direction but also a lower direction based on one element.

Hereinafter, an optical axis direction used may be defined as an optical axis direction of a lens coupled to a camera actuator and a camera module, and a vertical direction may be defined as a direction perpendicular to the optical axis.

An auto-focus function used below may be defined as a function that automatically focuses on a subject by moving the lens in the optical axis direction according to a distance of the subject so that a clear image of the subject can be obtained on an image sensor.

Meanwhile, the auto focus may correspond to AF. Also, closed-loop auto-focus (CLAF) control may be defined as real-time feedback (feedback) control of a position of a lens by sensing a distance between an image sensor and the lens to improve accuracy of focus control.

Hereinafter, a camera module and an optical device including the same according to an embodiment will be described in detail. First, an overall structure of the camera module of a present invention will be described.

Figure 1:
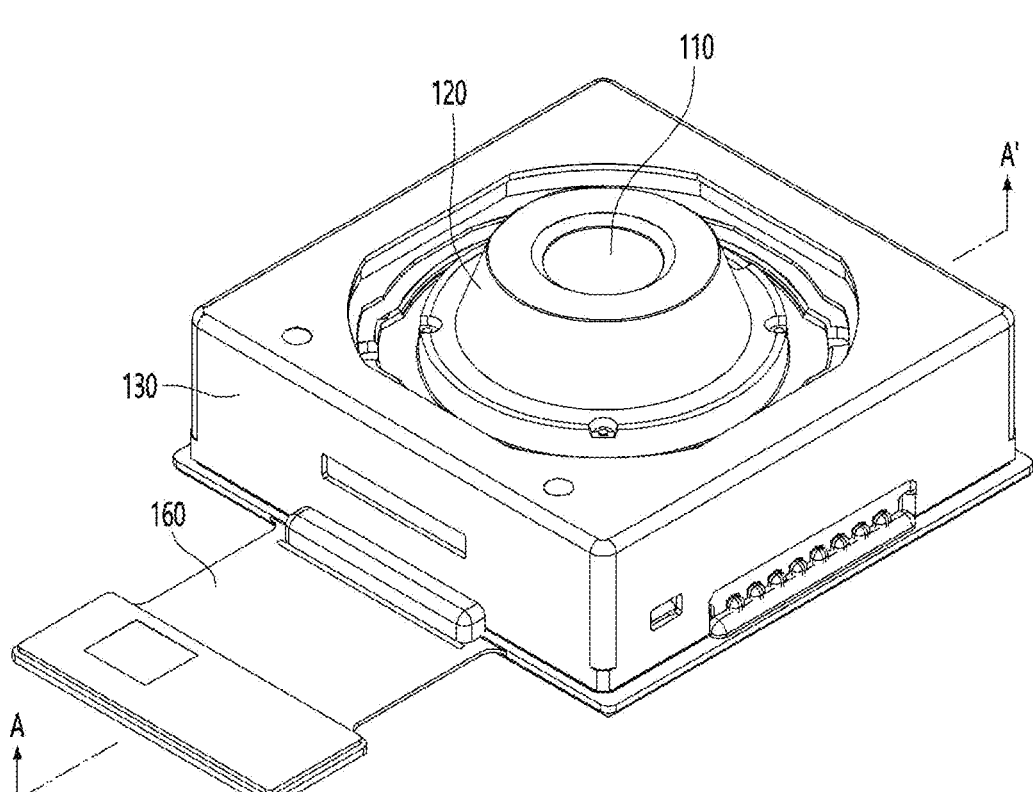
FIG. 1 is a perspective view of a camera module according to an embodiment.
Figure 2:
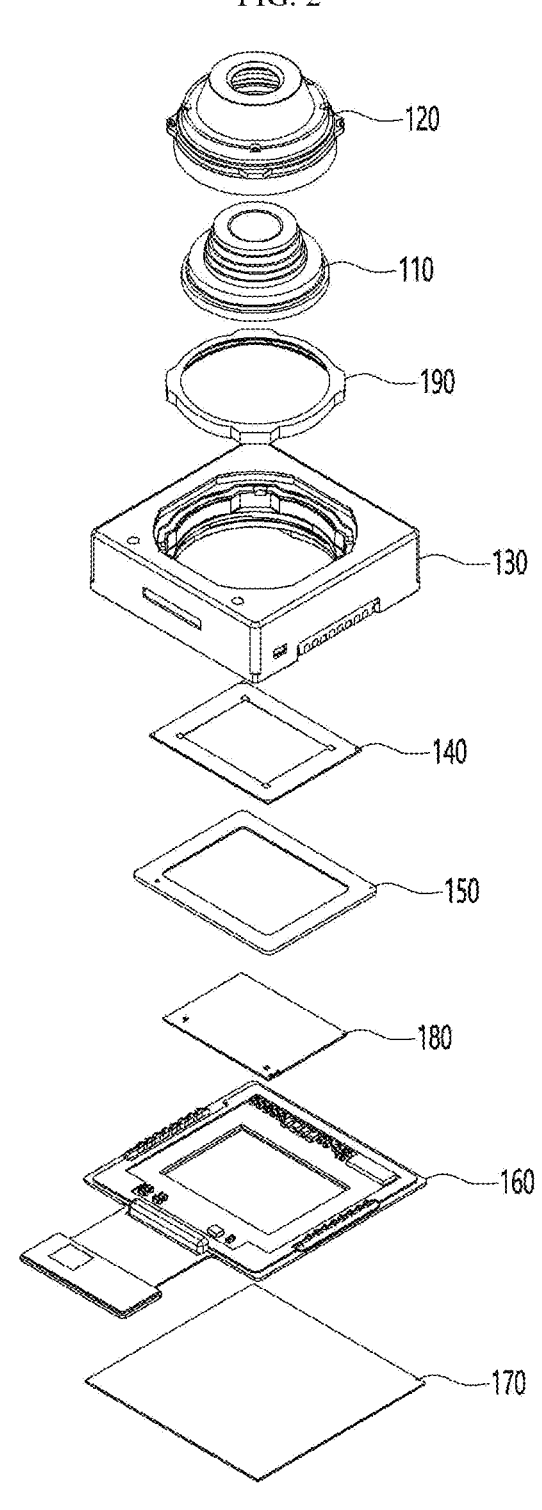
FIG. 2 is an exploded perspective view of a camera module according to an embodiment.
Figure 3:
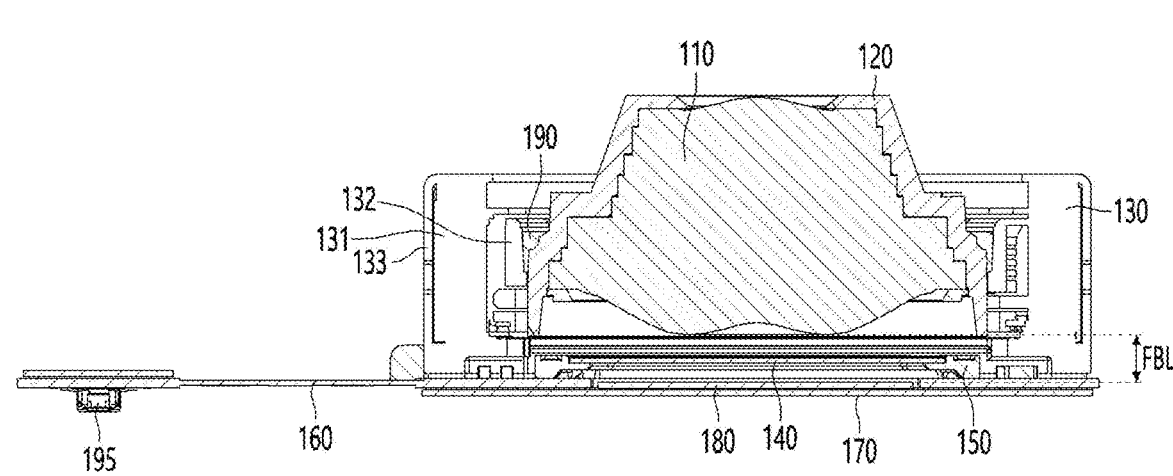
FIG. 3 is a cross-sectional view of the camera module of FIG. 1 in a direction A-A'.

FIG. 1 is a perspective view of a camera module according to an embodiment, FIG. 2 is an exploded perspective view of a camera module according to an embodiment, and FIG. 3 is a cross-sectional view of the camera module of FIG. 1 in a direction A-A'.

Referring to FIGS. 1 to 3, the camera module 100 according to an embodiment may include a lens 110, a lens barrel 120, a lens driving device 130, a filter unit 140, a base 150, a circuit board 160, a reinforcement plate 170, a sensor 180, and an adhesive member 190.

Here, the camera module 100 may be represented by being replaced with a photographer. In addition, the base 150 may be represented by being replaced with a holder, a sensor base, an inner base, a filter mounting part, or a filter seating part. Also, the lens driving device 130 may be referred to as an actuator for driving the lens 110 or the lens barrel 120.

The lens 110 or the lens barrel 120 may be coupled to the lens driving device 130. For example, the lens 110 or the lens barrel 120 may be mounted on the lens driving device 130. For example, the lens 110 may be mounted within the lens barrel 120. The lens barrel 120 may be mounted on the lens driving device 130.

In this case, the lens driving device 130 includes a bobbin 132. And, the lens barrel 120 may be coupled to the bobbin 132 of the lens driving device 130.

An adhesive member 190 may be disposed between an outer surface of the lens barrel 120 and an inner surface of the bobbin 132 of the lens driving device 130. In addition, the lens barrel 120 may be coupled to the bobbin 132 of the lens driving device 130 through the adhesive member 190. In this case, the lens barrel 120 may move together with the bobbin of the lens driving device 130.

For example, the lens driving device 130 includes a fixed part having a fixed position and a moving part moving with respect to the fixed part. Also, the bobbin 132 is included in the moving part of the lens driving device 130. In this case, the lens barrel 120 is coupled to the bobbin 132 of the moving part of the lens driving device 130. Accordingly, when the moving part of the lens driving device 130 moves, the lens barrel 120 may move together with the moving part. Therefore, the lens barrel 120 and the lens 110 coupled to the lens barrel 120 can also be referred to as a moving part of the camera module.

The lens 110 may be an optical system in which three or more lenses are stacked. The lens 110 may be an optical system in which five or more lenses are stacked. The lens 110 may be an optical system in which eight or more lenses are stacked. In this case, although the lens 110 is shown to include eight lenses in the drawing, the embodiment is not limited thereto. For example, the lens 110 may have a stacked structure of less than 8 sheets, or alternatively, may have a stacked structure of 9 sheets or more.

The lens 110 may include a lens made of a plastic material. The lens 110 according to an embodiment of the present invention may include a first lens unit made of a plastic material and a second lens unit made of a glass material. And, a number of lenses in the first lens unit made of the plastic material may be greater than a number of lenses in the second lens unit made of the glass material. For example, the number of lenses in the first lens unit made of the plastic material may be two or more.

In an embodiment, the lens 110 may be stacked with plastic lenses and/or glass lens(s). Here, a coefficient of thermal expansion (CTE) of the plastic material is higher than a coefficient of thermal expansion (CTE) of the glass material by five times or more, and a change value of a refractive index ($|dN/Dt|$) according to a function of temperature may be higher than that of the plastic material by ten times or more. Here, dN is a change value of a refractive index of the lens, and dT is a change value of a temperature.

Furthermore, the camera module 100 may be any one of a camera module for an auto focus (AF) and a camera module for an optical image stabilizer (OIS). A camera module for AF refers to one that can only perform the autofocus function. A camera module for OIS refers to one that performs both the autofocus function and the OIS function.

For example, the lens driving device 130 may be a lens driving device for AF or a lens driving device for OIS. Here, the meanings "for AF" and "for OIS" may be the same as those described in the camera module for AF and the camera module for OIS.

For example, the lens driving device 130 of the camera module 100 may be a lens driving device for OIS.

The lens driving device 130 may include a housing 131 and a bobbin 132 disposed in the housing 131 and coupled to the lens barrel 120.

In this case, the bobbin 132, the lens 110, and the lens barrel 120 disposed in the housing 131 may be referred to as a moving part that move during AF driving or OIS driving.

Also, although not specifically shown in the drawing, the lens driving device 130 may include a first coil (not shown) coupled to the bobbin 132. Also, the lens driving device 130 may include a magnet (not shown) coupled to the housing 131 and opposite to the first coil.

Also, the lens driving device 130 may include at least one upper elastic member (not shown) coupled to an upper portion of the housing 131 and an upper portion of the bobbin 132. Also, the lens driving device 130 may include at least one lower elastic member (not shown) coupled to a lower portion of the housing 131 and a lower portion of the bobbin 132.

In addition, the lens driving device 130 may include a cover member 133 that provides a space for accommodating components of the camera module.

The lens driving device 130 according to an embodiment may move the bobbin 132 and the lens barrel 120 to be coupled to the bobbin 132 in the optical axis direction by an electromagnetic force by an interaction between the first coil and the magnet. In addition, positions of the lens barrel 120 and the lens 110 coupled to the lens barrel 120 in the optical axis direction may be controlled by the electromagnetic force. Accordingly, AF driving may be implemented.

In addition, the lens driving device 130 may further include a second coil (not shown). In addition, the lens driving device 130 may move the housing 131 in a direction perpendicular to the optical axis direction by an electromagnetic force resulting from the interaction between the second coil and the magnet. Accordingly, OIS driving may be implemented.

In addition, the lens driving device 130 of the camera module 100 may include a position sensor unit (not shown) for AF feedback driving. The position sensor unit may include a sensing magnet (not shown) disposed in a bobbin 132 and an AF position sensor (for example, a Hall sensor (to be described later)) disposed in the housing 131.

In addition, the lens driving device 130 may further include a sensor substrate (not shown) disposed in the housing 131 and on which the AF position sensor is disposed or mounted. In another embodiment, the AF position sensor may be disposed in the bobbin 132, and the sensing magnet may be disposed in the housing 131.

The AF position sensor detects a strength of a magnetic field of the sensing magnet according to the movement of the bobbin 132. In addition, the AF position sensor may generate an output signal according to a result of the detection. The AF position sensor may be electrically connected to a driving substrate through an upper elastic member (or a lower elastic member). The driving substrate may provide a driving signal to the AF position sensor. In addition, the driving substrate may receive an output signal of the AF position sensor.

Briefly explaining the operation thereof, a driving signal (e.g., driving current) may be provided to the first coil. In addition, the bobbin 132 may be moved in the optical axis direction by an electromagnetic force due to the interaction between the first coil and the magnet based on the provided driving signal.

At this time, the stroke of the lens barrel is increasing due to the technological development of the camera module. The stroke means a range of movement in the optical axis direction of the lens barrel. Accordingly, it may be difficult to accurately detect a position of the lens barrel in an entire stroke with only one AF position sensor. Therefore, the embodiment uses two AF position sensors to accurately detect the position of the lens barrel. A structure and operation thereof for detecting the position of the lens barrel using the two AF position sensors will be described in detail below.

The base 150 may be placed under the lens driving device 130. The filter unit 140 may be mounted on the base 150.

That is, the base 150 may have a mounting portion on which the filter unit 140 is mounted. The base 150 may include a window having an opening in which the filter unit 140 is mounted. An adhesive material (not shown) may be applied between the base 150 and the filter unit 140. For example, an adhesive member may be disposed between the mounting portion (to be described later) of the base 150 and the filter unit 140. The adhesive member may be an epoxy, a thermosetting adhesive, an ultraviolet-curable adhesive, etc.

Meanwhile, the base 150 may be manufactured by any one of a metal press method, a die casting method, and a MIM (Metal Insert Mold) method. Specifically, the base 150 may also be referred to as a metal frame including a metal material.

At this time, the base 150 includes a metal material, and thus, rigidity may be improved. Furthermore, in the embodiment, a flatness of the filter unit 140 mounted on the base 150 may be improved.

That is, as the technology of the camera module develops, the size of the image sensor increases. Accordingly, the size and weight of the filter unit 140 increase. Accordingly, the base 150 of the embodiment is formed of a metal material, thereby enabling stable fixation of the filter unit 140.

In addition, the base 150 has a certain level of thickness for stable fixation of the filter unit 140. At this time, the embodiment can reduce a thickness of the base 150 compared to a comparative example.

For example, a base of the comparative example is an injection-molded product made of an insulating material. Accordingly, the base of the comparative example has a thickness of 180 μm or more. In contrast, the base 150 of the embodiment can have a thickness smaller than 180 μm by being formed of a metal material. Accordingly, the embodiment can reduce a FBL (Flange Back Length) by the reduced thickness of the base 150.

The filter unit 140 can be disposed on the base 150. The filter unit 140 can block light of a specific frequency band in the light passing through the lens 110 accommodated in the lens barrel 120. For example, the filter unit 140 can block light of a specific frequency band from being incident on the image sensor 180. For example, the filter unit 140 may be an infrared filter, but is not limited thereto. The filter unit 140 may be arranged parallel to a direction perpendicular to the optical axis OA.

The circuit board 160 may be arranged below the base 150. That is, the base 150 may be attached or coupled to the circuit board 160.

The camera module 100 of the embodiment includes a sensor 180. The sensor 180 may also be referred to as an image sensor.

The sensor 180 is disposed on the circuit board 160. At this time, the circuit board 160 includes a cavity (not shown), and the sensor 180 may be disposed within the cavity. For example, the sensor 180 may overlap the cavity of the circuit board 160 in the optical axis direction.

The camera module 100 according to an embodiment may include a reinforcement plate 170.

The reinforcement plate 170 may be attached to a lower surface of the circuit board 160.

The reinforcement plate 170 may include an overlapping region that overlaps the cavity of the circuit board 160 in an optical axis.

In addition, the sensor 180 may be attached to an upper surface of the overlapping region of the reinforcement plate 170. For example, the sensor 180 may be attached to an upper surface of the overlapping region of the reinforcement plate 170 while being disposed in a cavity of the circuit board 160.

That is, in recent years, a resolution required by the camera module is increasing. In addition, as the resolution increases, a size of the sensor 180 is increasing. In this case, when the sensor 180 is disposed on the circuit board 160, it may be difficult to maintain the flatness of the sensor 180 that gradually increases in size. Also, when the sensor 180 is disposed on the circuit board 160, heat dissipation characteristics of the sensor 180 may be deteriorated.

Accordingly, in an embodiment, the reinforcement plate 170 is attached to a lower surface of the circuit board 160. In addition, in an embodiment, the sensor 180 may be attached on the reinforcement plate 170 instead of the circuit board 160.

For example, the sensor 180 of the embodiment may be directly attached on the reinforcement plate 170. Here, the direct attachment may mean that the sensor 180 is directly disposed on an adhesive member (not shown) disposed on the reinforcement plate 170.

Meanwhile, while the sensor 180 is disposed on the reinforcement plate 170, the sensor 180 may be exposed through the cavity of the circuit board 160. In addition, a terminal of the sensor 180 may be electrically connected to a pad 162 of the circuit board 160.

The reinforcement plate 170 may be a plate-shaped member having a thickness and hardness of a predetermined level or higher. Accordingly, the reinforcement plate 170 may stably support the sensor 180. In addition, the reinforcement plate 170 may inhibit the sensor 180 from being damaged by an external impact. For example, the reinforcement plate 170 may protect the sensor 180 from an external impact. In addition, the reinforcement plate 170 may dissipate heat generated by the sensor 180. Accordingly, the reinforcement plate 170 may perform a heat dissipation function of dissipating heat generated by the sensor 180 to an outside, while improving the flatness of the sensor 180.

To this end, the reinforcement plate 170 may include a metal material having high thermal conductivity. For example, the reinforcement plate 170 may be SUS. However, the embodiment is not limited thereto. The reinforcement plate 170 may be formed of aluminum having high thermal conductivity other than SUS. In addition, as another example, the reinforcement plate 170 may include glass, plastic, or synthetic resin.

The reinforcement plate 170 may be connected to a ground (not shown) of the circuit board 160. For example, the reinforcement plate 170 may be electrically connected to a ground pattern (not shown) of the circuit board 160. Accordingly, the reinforcement plate 170 may serve as a ground for protecting the camera module from an electrostatic discharge protection (ESD).

In addition, the base 160 can be connected to a ground pattern of a circuit board. Accordingly, the embodiment may further improve heat dissipation characteristics of the camera module.

Light passing through the filter unit 140 may be incident on the sensor 180. The sensor 180 may be a portion in which an image included in light incident through the filter unit 140 is formed.

The circuit board 160 may convert an image formed on the sensor 180 into an electrical signal and transmit the electrical signal to an external device. To this end, the circuit board 160 may include various circuit parts, element units, control units (for example, driver IC), etc. In addition, the circuit board 160 may include an element part or a pattern part electrically connected to the sensor 180.

Meanwhile, the sensor 180 may receive an image included in incident light and convert the received image into an electrical signal. For example, the sensor 180 may be a charge-coupled device (CCD), a complementary metal-oxide semiconductor (CMOS), etc. However, embodiments are not limited thereto, and the sensor 180 may be implemented by other devices performing a function similar to that of the CCD or CMOS.

Meanwhile, a motion sensor (not shown) may be mounted or disposed on the circuit board 160. The motion sensor may be electrically connected to a control unit (driver IC) through a pattern portion provided on the circuit board 160.

The motion sensor may obtain rotational angular velocity information according to a movement of the camera module 100. The motion sensor may be a two-axis or three-axis gyro sensor. The motion sensor may be an angular velocity sensor. A control device may be mounted or arranged on the circuit board 160.

The circuit board 160 may be electrically connected to a lens driving device 130. For example, the circuit board 160 may be electrically connected to a driving substrate of the lens driving device 130.

For example, a control unit (to be described later) of the circuit board 160 may supply a driving signal to the first coil and the second coil of the lens driving device 130. In addition, the control unit of the circuit board 160 can supply a driving signal to the AF position sensor (or OIS position sensor). In addition, the control unit of the circuit board 160 can receive an output signal of the AF position sensor (or OIS position sensor). The control unit can be referred to as a driver IC. For example, the control unit can be referred to as a driving element. For example, the control unit can be referred to as a driving unit. The AF position sensor can mean a position sensor unit 250 described below.

The circuit board 160 and the control unit and position sensor unit disposed on the circuit board 160 can also be referred to as a 'driving unit' that drives the moving part.

In addition, the 'driving unit' can include a first coil and a magnet included in the lens driving device 130. In addition, a position sensor unit 250 of the driving unit can detect a position of the moving part. The control unit of the driving unit outputs a control signal to move a moving part to a target position based on the detected position. The control signal may mean an intensity and direction of the current supplied to the first coil.

Meanwhile, the camera module 100 includes a connector 195.

The connector 190 may be disposed on the circuit board 160. For example, the connector 195 may be electrically connected to the circuit board 160. The connector 195 may include a port electrically connected to an external device.

Hereinafter, a lens driving device according to an embodiment will be described in detail.

Figure 4:
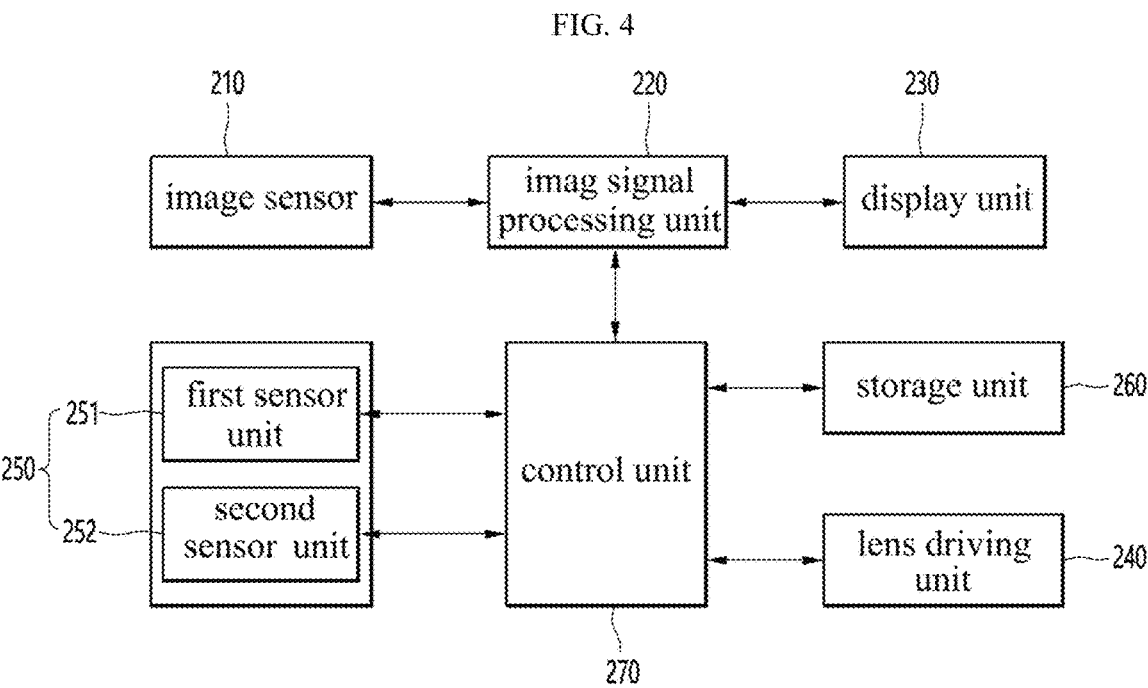
FIG. 4 is a block diagram showing a configuration of a camera module according to an embodiment.

FIG. 4 is a block diagram showing a configuration of a camera module according to an embodiment.

Referring to FIG. 4, the camera module according to the embodiment may include an image sensor 210, an image signal processing unit 220, a display unit 230, a lens driving unit 240, a position sensor unit 250, a storage unit 260, and a control unit 270.

As described above, the image sensor 210 processes an optical image of a subject captured through a lens. To this end, the image sensor 210 may process image information acquired through the lens. In addition, the image sensor 210 may convert the processed image information into electrical data and output the electrical data.

The image sensor 210 is a form in which a plurality of photodetectors are integrated as individual pixels, and converts the image information of the subject into electrical data and outputs the electrical data. The image sensor 210 accumulates an amount of input light, and outputs an image captured by the lens in accordance with the accumulated amount of light in accordance with a vertical synchronization signal. At this time, image acquisition is performed by the image sensor 210 that converts light reflected from the subject into an electrical signal. Meanwhile, in order to obtain a color image using the image sensor 210, a color filter is required, and for example, a CFA (Color Filter Array) filter may be employed. The CFA passes only light representing one color per pixel, has a regularly arranged structure, and has various forms depending on the arrangement structure.

An image signal processing unit 220 processes the image output through the image sensor 210 on a frame basis. At this time, the image signal processing unit 220 may also be referred to as an ISP (Image Signal Processor).

At this time, the image signal processing unit 220 may include a lens shading compensation unit (not shown). The lens shading compensation unit is a block for compensating for the lens shading phenomenon that appears differently in the amount of light in the center and edge regions of the image, and receives a lens shading setting value from the control unit 270 described below, and compensates for the color of the center and edge regions of the image.

Furthermore, the lens shading compensation unit may receive a shading variable set differently depending on a type of lighting, and process the lens shading of an image according to the received variable. Accordingly, the lens shading compensation unit may perform lens shading processing by applying a shading degree differently depending on the type of lighting. Meanwhile, the lens shading compensation unit may receive a shading variable set differently depending on an automatic exposure weight applied to a specific area of the image in order to inhibit a saturation phenomenon occurring in the image, and process the lens shading of the image according to the received variable. More specifically, the lens shading compensation unit compensates for a brightness change occurring in an edge region of the image signal as an automatic exposure weight is applied to the center region of the image signal. That is, when the saturation of the image signal occurs due to lighting, since the intensity of light decreases from the center to the edge in a concentric circle, the lens shading compensation unit amplifies an edge signal of the image signal to compensate for the brightness compared to the center.

Meanwhile, the image signal processing unit 220 can measure a sharpness of the image acquired through the image sensor 210. That is, the image signal processing unit 220 can measure the sharpness of the image in order to check the focus accuracy of the image acquired through the image sensor 210. The sharpness can be measured for each image acquired according to a position of the focus lens.

The display unit 230 displays the captured image according to the control of the control unit 270 described below, and displays a setting screen required for taking a picture or a screen for selecting a user's action.

The lens driving unit 240 moves the lens barrel 120. For example, the lens driving unit 240 can move the lens barrel 120 in the optical axis direction.

The position sensor unit 250 can detect a position of the lens barrel 120 moving through the lens driving unit 240.

Preferably, the position sensor unit 250 can detect a current position of the lens barrel 120 and a moving position of the lens barrel 120 moved through the lens driving unit 240.

In addition, the position sensor unit 250 can output a detection signal corresponding to a position of the lens barrel 120.

The position sensor unit 250 includes a plurality of sensor units.

For example, the position sensor unit 250 can include a first sensor unit 251 and a second sensor unit 252.

Each of the first sensor unit 251 and the second sensor unit 252 includes a plurality of input terminals and a plurality of output terminals. In addition, the plurality of output terminals of the first sensor unit 251 are not connected to the plurality of output terminals of the second sensor unit 252. Here, not being connected means that the plurality of output terminals of the first sensor unit 251 and the plurality of output terminals of the second sensor unit 252 are not directly connected to each other (for example, serial connection and/or parallel connection).

For example, a plurality of output terminals of the first sensor unit 251 and a plurality of output terminals of the second sensor unit 252 are respectively connected to a control unit 270 to be described later. In addition, the control unit 270 can detect the position of the lens barrel 120 based on signals output from each of the output terminals of the first sensor unit 251 and the second sensor unit 252. That is, the control unit 270 is connected to the first sensor unit 251 and the second sensor unit 252, and can obtain position information based on the output signals of the first sensor unit 251 and the second sensor unit 252. The position information may mean position information of the moving part of the camera module. For example, the position information may be position information of the lens barrel 120 or the lens 110. This will be described in more detail below.

A storage unit 260 stores data required for the operation of the camera module 100. In particular, the storage unit 260 may store position information of the lens barrel 120 according to a distance from a subject. For example, the storage unit 260 may store information on a focusing position for focusing on the subject. The information on the focusing position may be position information of the lens barrel 120 for accurately focusing on the subject. In addition, the focusing position may change according to the distance from the subject. Therefore, the storage unit 260 may store data corresponding to the position of the lens barrel 120 according to the distance.

The control unit 270 controls the overall operation of the camera module.

In particular, the control unit 270 controls the position sensor unit 250.

For example, the control unit 270 can provide a bias current to the position sensor unit 250 to drive the position sensor unit 250. In addition, when a magnetic flux passes through the position sensor unit 250, a Hall voltage can be generated in a direction perpendicular to the bias current and the magnetic flux. At this time, the Hall voltage can correspond to the intensity of the magnetic flux. In addition, the intensity of the magnetic flux can correspond to the position of the lens barrel 120. Therefore, the control unit 270 can detect the position of the lens barrel 120 using the Hall voltage output through the position sensor unit 250.

When a current position of the lens barrel 120 is detected, the control unit 270 outputs a control signal to move the lens barrel 120 to a target position based on the current position of the lens barrel 120. The control signal may be a direction and intensity of the driving current supplied to the first coil (not shown) of the lens driving unit 240.

At this time, a plurality of first output signals output through a plurality of output terminals of the first sensor unit 251 are input to the control unit 270. In addition, a plurality of second output signals output through a plurality of output terminals of the second sensor unit 252 are input to the control unit 270.

In addition, the control unit 270 receives the plurality of first output signals and the plurality of second output signals. For this purpose, the control unit 270 includes ports for receiving the plurality of first output signals and the plurality of second output signals. For example, the control unit 270 may individually receive the plurality of first output signals and the plurality of second output signals. For this purpose, the control unit 270 may include four ports.

In addition, the control unit 270 can differentially amplify the four output signals received through the four ports. At this time, the differential amplification signal can correspond to the position detection signal of the lens barrel 120 obtained by a combination of the output signals of the first sensor unit 251 and the second sensor unit 252. In addition, the control unit 270 can detect the current position and the moving position of the lens barrel 120 based on the position detection signal obtained by the combination of the output signals.

In addition, the control unit 270 can output a control signal for moving the lens barrel 120 to the target position based on the current position and the moving position. In addition, the lens driving unit 240 can move the lens barrel 120 to the target position based on the control signal.

Hereinafter, the connection relationship between the position sensor unit 250 and the control unit 270 of the embodiment and a position detection operation of the lens barrel 120 using the same will be specifically described.

Figure 5:
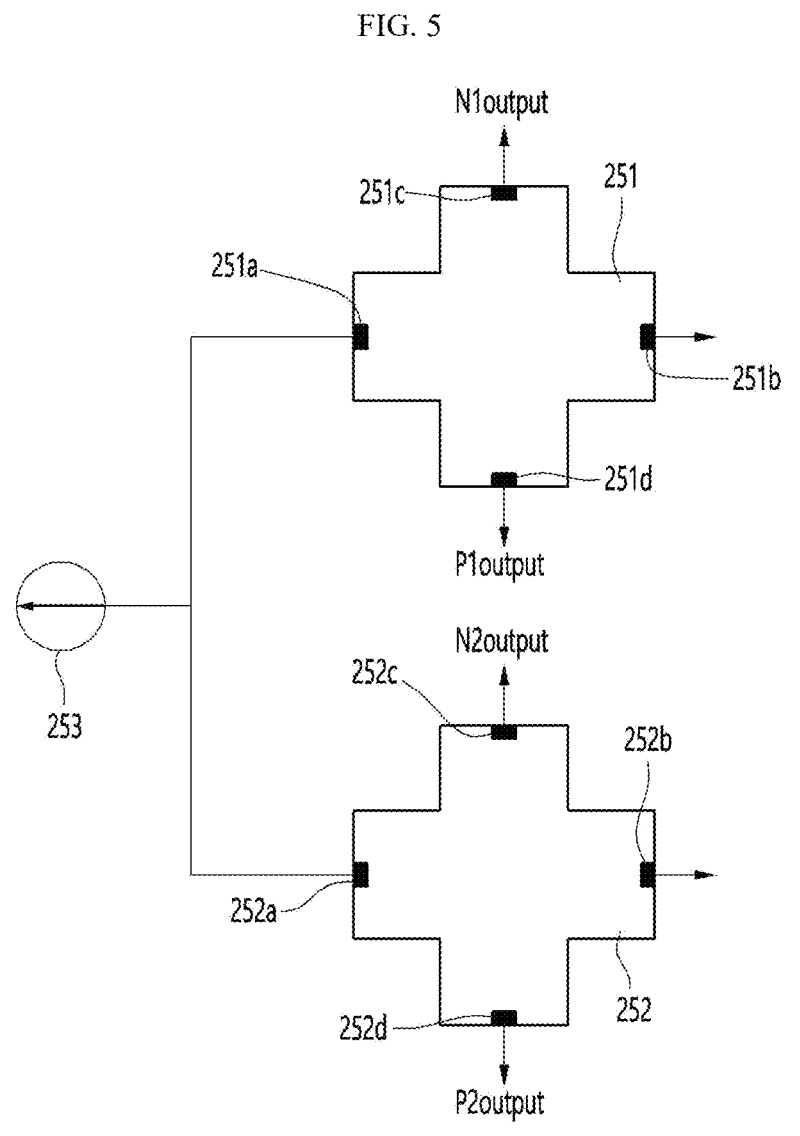
Figure 6:
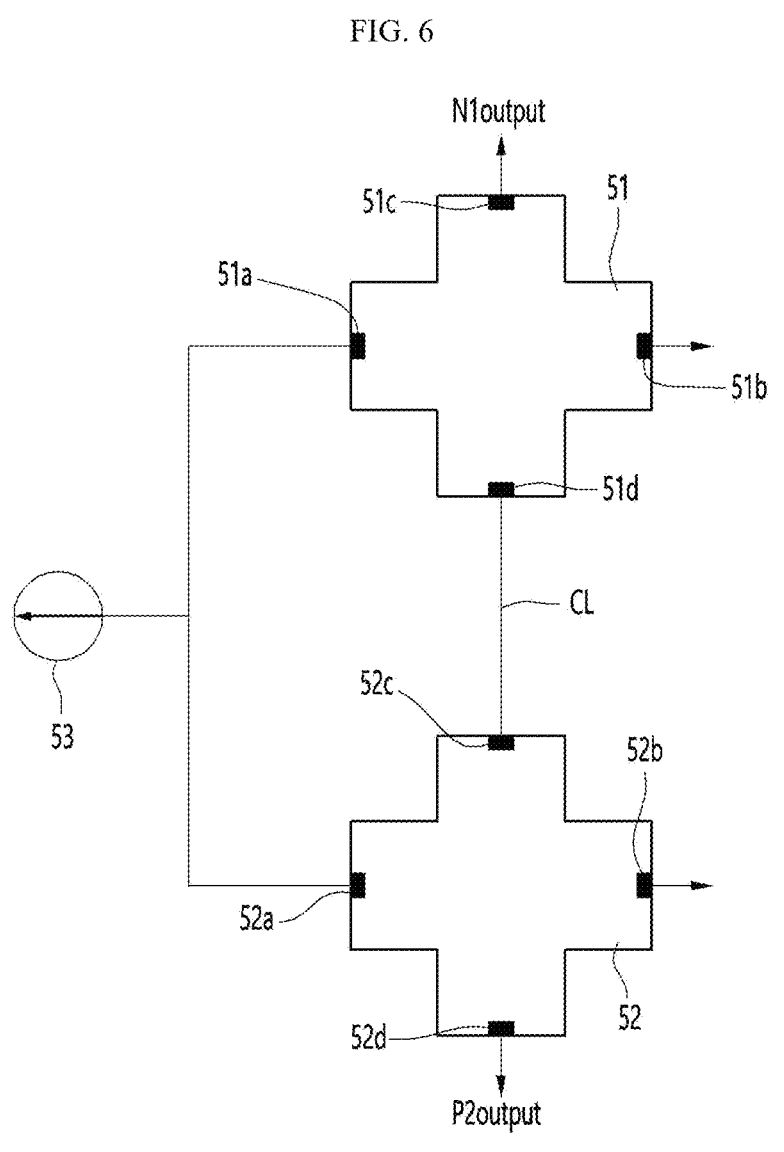
Figure 7:
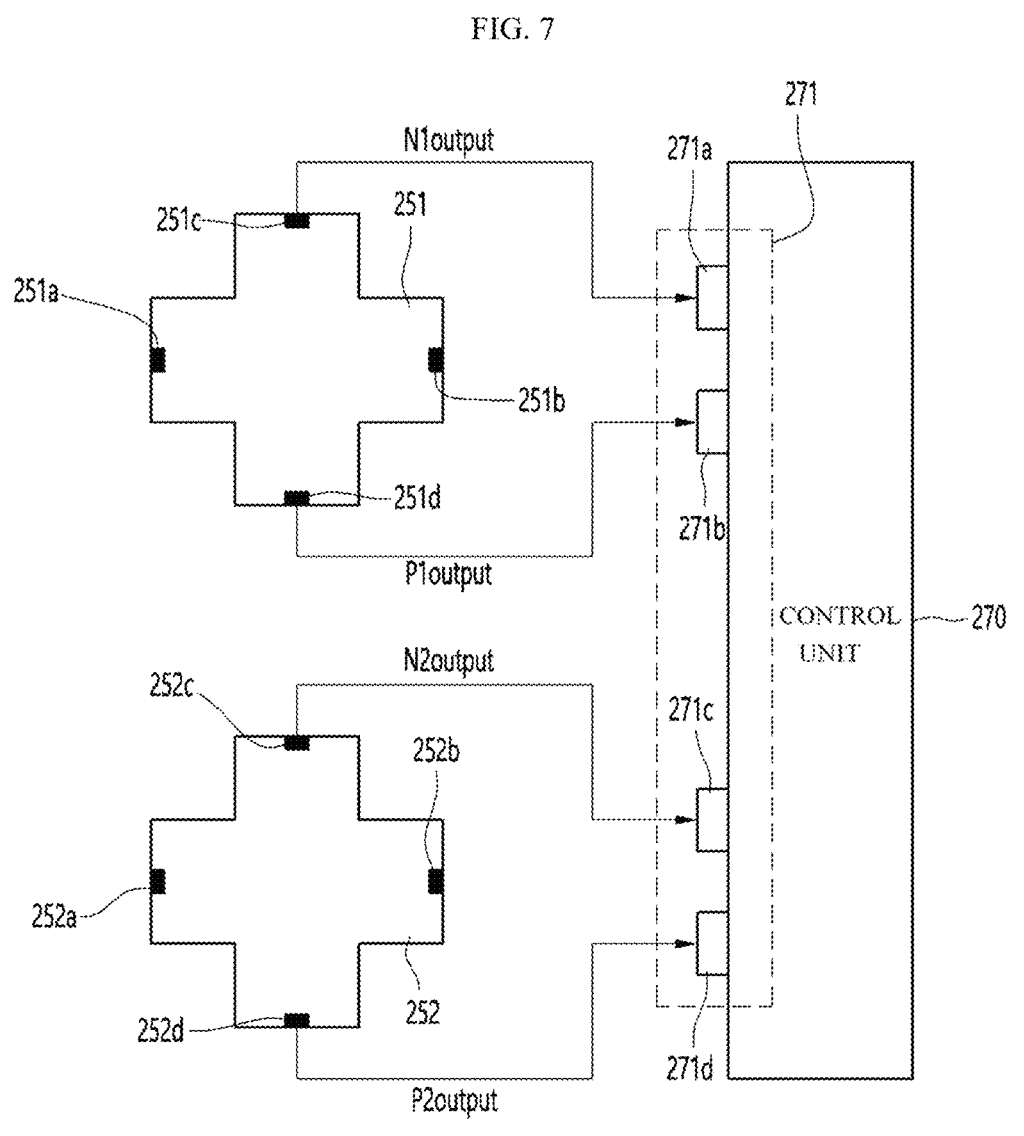

FIG. 5 is a view explaining a connection relationship of a position sensor unit according to an embodiment, FIG. 6 is a view showing a connection relationship of a position sensor unit of a comparative example compared to an embodiment, and FIG. 7 is a view explaining a connection relationship between a position sensor unit and a control unit according to an embodiment.

Referring to FIG. 5, the position sensor unit 250 of the embodiment includes a first sensor unit 251 and a second sensor unit 252.

At this time, the first sensor unit 251 may include a plurality of first input terminals and a plurality of first output terminals. At this time, the plurality of first input terminals may mean power input terminals for inputting power to the first sensor unit 251. In addition, the plurality of first output terminals may mean signal output terminals for outputting output signals of the first sensor unit 251. The output signal of the first sensor unit 251 may correspond to a position detection signal of the lens barrel 120 detected by the first sensor unit 251.

The first input terminal of the first sensor unit 251 may include a first-first input terminal 251*a* and a first-second input terminal 251*b*.

The first-first input terminal 251*a* may be a terminal into which positive polarity (+) power is input. The first-second input terminal 251*b* may be a terminal into which negative polarity (−) power is input.

In addition, the first output terminal of the first sensor unit 251 may include a first-first output terminal 251*c* and a first-second output terminal 251*d*.

The first-first output terminal 251*c* may be a terminal from which a negative polarity (−) output signal is output. The first-second output terminal 251*d* may be a terminal from which a positive polarity (+) output signal is output.

In addition, the second sensor unit 252 may include a plurality of second input terminals and a plurality of second output terminals. At this time, the plurality of second input terminals may mean power input terminals for inputting power to the second sensor unit 252. In addition, the plurality of second output terminals may mean signal output terminals for outputting output signals of the second sensor unit 252. The output signal of the second sensor unit 252 may correspond to a position detection signal of the lens barrel 120 detected by the second sensor unit 252.

The second input terminal of the second sensor unit 252 may include a second-first input terminal 252*a* and a second-second input terminal 252*b*.

The second-first input terminal 252*a* may be a terminal into which positive polarity (+) power is input. The second-second input terminal 252*b* may be a terminal into which negative polarity (−) power is input.

In addition, the second output terminal of the second sensor unit 252 may include a second-first output terminal 252*c* and a second-second output terminal 252*d*.

The second-first output terminal 252*c* may be a terminal from which a negative polarity (−) output signal is output. The second-second output terminal 252*d* may be a terminal from which a positive polarity (+) output signal is output.

A bias current may be input to the first-first input terminal 251*a* of the first sensor unit 251 and the second-first input terminal 252*a* of the second sensor unit 252.

To this end, the position sensor unit 250 may include a bias current providing unit 253. The bias current providing unit 253 may provide a bias current to each of the first-first input terminal 251*a* of the first sensor unit 251 and the second-first input terminal 252*a* of the second sensor unit 252.

At this time, the bias current providing unit 253 may be configured as a circuit that robustly generates a bias current against an external environment or process deviation, such as a band-gap reference circuit. For example, the bias current providing unit 253 may include a transistor (not shown). In addition, the bias current providing unit 253 may be configured so that a bias current is formed between drain/source terminals of the transistor according to a voltage applied to a gate terminal of the transistor. For example, the bias current providing unit 253 may receive a digital control signal and generate an analog voltage corresponding to the digital control signal. At this time, the analog voltage may be applied to the gate terminal of the transistor or some transistors of the band-gap reference circuit.

At this time, the bias current providing unit 253 may be commonly connected to the first-first input terminal 251*a* of the first sensor unit 251 and the second-first input terminal 252*a* of the second sensor unit 252. Accordingly, a common bias current output from the bias current providing unit 253 may be provided to the first-first input terminal 251*a* of the first sensor unit 251 and the second-first input terminal 252*a* of the second sensor unit 252.

However, the embodiment is not limited thereto. For example, the first-second input terminal 251*b* of the first sensor unit 251 and the second-first input terminal 252*a* of the second sensor unit 252 may be directly connected to each other. Accordingly, the bias current providing unit 253 can provide a bias current to the first-first input terminal 251*a* of the first sensor unit 251. In addition, the second sensor unit 252 can receive a bias current transmitted from the first-second input terminal 251*b* of the first sensor unit 251 through the second-first input terminal 252*a*.

An equivalent circuit of each of the first sensor unit 251 and the second sensor unit 252 can include a plurality of Hall sensor resistors. For example, each of the first sensor unit 251 and the second sensor unit 252 can have an equivalent circuit including the first to fourth resistors. In addition, the bias current can flow through the first to fourth resistors of each of the first sensor unit 251 and the second sensor unit 252. However, the equivalent circuits of the first sensor unit 251 and the second sensor unit 252 of the embodiment may be implemented as equivalent circuits of various types other than the equivalent circuits including the first to fourth resistors.

Meanwhile, the first sensor unit 251 and the second sensor unit 252 of the embodiment may be a Hall sensor. The Hall sensor may detect a magnetic flux passing through the hall sensor by using the Hall effect.

For example, the first sensor unit 251 may be a first Hall sensor. In addition, when a magnetic flux passes through the first Hall sensor, the first Hall sensor may generate a bias current and a Hall voltage in a direction perpendicular to the magnetic flux. In addition, the generated Hall voltage may be output to the first-first output terminal 251*c* and the first-second output terminal 251*d* of the first sensor unit 251 corresponding to the first Hall sensor. For example, a difference between the voltages output to the first-first output terminal 251*c* and the first-second output terminal 251*d* of the first sensor unit 251 may correspond to the generated Hall voltage. Accordingly, a difference value between the output signals output through the first-first output terminal 251*c* and the first-second output terminal 251*d* of the first sensor unit 251 may be used as a measurement value for the magnetic flux passing through the first sensor unit 251. In addition, the measurement value may be used as a position detection signal of the lens barrel 120 obtained through the first sensor unit 251.

In response to this, the second sensor unit 252 may be a second Hall sensor. In addition, when a magnetic flux passes through the second Hall sensor, the second Hall sensor may generate a Hall voltage in a direction perpendicular to the bias current and the magnetic flux. In addition, the generated Hall voltage may be output to the second-first output terminal 252*c* and the second-second output terminal 252*d* of the second sensor unit 252 corresponding to the second Hall sensor. For example, a difference between voltages output to the second-first output terminal 252*c* and the second-second output terminal 252*d* of the second sensor unit 252 may correspond to the generated Hall voltage. Therefore, a difference value between output signals output through the second-first output terminal 252*c* and the second-second output terminal 252*d* of the second sensor unit 252 may be used as a measurement value for the magnetic flux passing through the second sensor unit 252. In addition, the measurement value can be used as a position detection signal of the lens barrel 120 obtained through the second sensor unit 252.

Meanwhile, the first-first output terminal 251*c* and the first-second output terminal 251*d* of the first sensor unit 251 are not directly connected to the second-first output terminal 252*c* and the second-second output terminal 252*d* of the second sensor unit 252.

Specifically, the first-first output terminal 251*c* and the first-second output terminal 251*d* of the first sensor unit 251 and the second-first output terminal 252*c* and the second-second output terminal 252*d* of the second sensor unit 252 are respectively connected to different ports of the control unit 270.

For example, a first-first output signal (N1output) of the first-first output terminal 251*c* of the first sensor unit 251, a first-second output signal (P1output) of the first-second output terminal 251*d*, a second-first output signal (N2output) of the second-first output terminal 252*c* and a second-second output signal (P2output) of the second-second output terminal 252*d* of the second sensor unit 252 are each transmitted to the control unit 270. Therefore, the control unit 270 individually or independently receives the first-first output signal (N1output) of the first-first output terminal 251*c*, the first-second output signal (P1output) of the first-second output terminal 251*d*, the second-first output signal (N2output) of the second-first output terminal 252*c*, and the second-second output signal (P2output) of the second-second output terminal 252*d*.

In addition, the control unit 270 can obtain a position detection signal of the lens barrel 120 through a selective combination of the four output signals output from the first sensor unit 251 and the second sensor unit 252. A detailed configuration of the control unit 270 will be described in more detail below.

As described above, the camera module of the embodiment includes the first sensor unit 251 and the second sensor unit 252. In addition, the first-first output terminal 251*c*, the first-second output terminal 251*d*, the second-first output terminal 252*c*, and the second-second output terminal 252*d* of the first sensor unit 251 and the second sensor unit 252 are connected to different ports of the control unit 270. Accordingly, the control unit 270 can process the first-first output signal (N1output), the first-second output signal (P1output), the second-first output signal (N2output), and the second-second output signal (P2output), respectively.

At this time, the control unit includes two ports, and thus may be able to receive differential signals of the two sensor units.

For example, referring to FIG. 6, a comparative example compared to the present embodiment includes a plurality of sensor units and a control unit connected to the plurality of sensor units.

The comparative example includes a first sensor unit 51 and a second sensor unit 52.

The first sensor unit 51 includes a plurality of first input terminals and a plurality of first output terminals.

In addition, the first input terminal of the first sensor unit 51 includes a first-first input terminal 51*a* and a first-second input terminal 51*b*.

In addition, the first output terminal of the first sensor unit 51 includes a first-first output terminal 51*c* and a first-second output terminal 51*d*.

In addition, the second sensor unit 52 includes a plurality of second input terminals and a plurality of second output terminals.

The second input terminal of the second sensor unit 52 includes a second-first input terminal 52*a* and a second-second input terminal 52*b*.

In addition, the second output terminal of the second sensor unit 52 includes a second-first output terminal 52*c* and a second-second output terminal 52*d*.

The bias current providing unit 53 provides a bias current to the first-first input terminal 51*a* of the first sensor unit 51 and the second-first input terminal 52*a* of the second sensor unit 52, respectively. That is, a common bias current is outputted from the bias current providing unit 53, and is provided to the first-first input terminal 51*a* of the first sensor unit 51 and the second-first input terminal 52*a* of the second sensor unit 52.

At this time, one of the plurality of first output terminals of the first sensor unit 51 of the comparative example is directly connected to one of the plurality of second output terminals of the second sensor unit 52.

Specifically, the comparative example has a structure in which the first-second output terminal 51*d* of the first sensor unit 51 and the second-first output terminal 52*c* of the second sensor unit 52 are directly connected to each other. For example, in the comparative example, a connection line CL is formed between the first-second output terminal 51*d* of the first sensor unit 51 and the second-first output terminal 52*c* of the second sensor unit 52. Therefore, the control unit of the comparative example includes only two input ports. Specifically, the control unit of the comparative example includes only the first port connected to the first-first output terminal 51*c* of the first sensor unit 51 and the second port connected to the second-second output terminal 52*d* of the second sensor unit 52. Accordingly, the control unit of the comparative example is provided with only signals corresponding to two of the four output terminals of the first sensor unit 51 and the second sensor unit 52 through the first and second ports. That is, a differential signal between the first sensor unit 51 and the second sensor unit 52 are input to the control unit of the comparative example.

However, the comparative example has a problem that the connection line (CL) for connecting the output terminals of the two sensor units must be disposed on the circuit board (not shown), and the manufacturing process of the circuit board becomes complicated.

In addition, the comparative example has a problem that when the output signal is transmitted through the connection line (CL), the output signal includes noise according to various usage environments, and the detection accuracy decreases accordingly.

Furthermore, the comparative example provides two signals fixed to the control unit. That is, the control unit of the comparative example provides only the output signal of the first-first output terminal 51*c* of the 1st sensor unit 51 and the output signal of the second-second output terminal 52*d* of the 2nd sensor unit 52. Therefore, the control unit of the comparative example performs limited operation operations. That is, the control unit of the comparative example can only perform addition or subtraction operations of the output signal of the first sensor unit 51 and the output signal of the second sensor unit. Accordingly, the comparative example has difficulty in efficiently responding to various usage environments of the camera module.

In addition, the comparative example cannot obtain a position detection signal of the lens barrel using only the output signal of the first sensor unit 51, or cannot obtain a position detection signal of the lens barrel using only the output signal of the second sensor unit 52.

Therefore, referring again to FIG. 5, the embodiment provides the two output signals of the first sensor unit 251 and the two output signals of the second sensor unit 252 to the control unit 270, respectively. Then, the control unit 270 receives the four output signals and obtains a final position detection signal through a selective operation of the four output signals.

Accordingly, the embodiment can obtain a position detection signal through a subtraction operation of the two output signals of the first sensor unit 251 and the two output signals of the second sensor unit 252 under a first condition.

In addition, the embodiment can obtain a position detection signal through an addition operation of two output signals of the first sensor unit 251 and two output signals of the second sensor unit 252 under a second condition.

In addition, the embodiment can obtain the position detection signal using only two output signals of the first sensor unit 251 under a third condition.

In addition, the embodiment can obtain the position detection signal using only two output signals of the second sensor unit 252 under a fourth condition.

To this end, referring to FIG. 7, the control unit 270 includes a port unit 271 connected to the position sensor unit 250. At this time, the port unit 271 may include a plurality of ports. At this time, the port unit 271 may include four ports. And, two of the four ports can be connected to two output terminals of the first sensor unit 251, and remaining two ports can be connected to two output terminals of the second sensor unit 252.

At this time, the port unit 271 of the control unit 270 is illustrated as including four ports in the drawing, but is not limited thereto.

For example, as the stroke of the camera module increases, the detection range of the position sensor unit must increase. Therefore, it may be impossible to cover the entire detection range corresponding to the stroke of the camera module using two sensor units. Accordingly, the camera module can detect the position of the lens module using three or more sensor units. In this case, the control unit 270 can include six or more ports. Hereinafter, it will be described assuming that the control unit 270 is a four-channel driver IC, and accordingly, the port unit 271 includes four ports.

The port unit 271 of the control unit 270 includes the first to fourth ports.

The port unit 271 may include a first port 271a connected to the first-first output terminal 251c of the first sensor unit 251. The first port 271a may receive the first-first output signal (N1output) output through the first-first output terminal 251c of the first sensor unit 251.

The port unit 271 may include a second port 271b connected to the first-second output terminal 251d of the first sensor unit 251. The second port 271b may receive the first-second output signal (P1output) output through the first-second output terminal 251d of the first sensor unit 251.

The port unit 271 may include a third port 271c connected to the second-first output terminal 252c of the second sensor unit 252. The third port 271c may receive the second-first output signal (N2output) output through the second-first output terminal 252c of the second sensor unit 252.

The port unit 271 may include a fourth port 272b connected to the second-second output terminal 252d of the second sensor unit 252. The fourth port 272b may receive the second-second output signal (P2output) output through the second-second output terminal 252d of the second sensor unit 252.

Hereinafter, the detailed configuration of the control unit of the embodiment and the connection relationship therebetween will be described.

Figure 8:
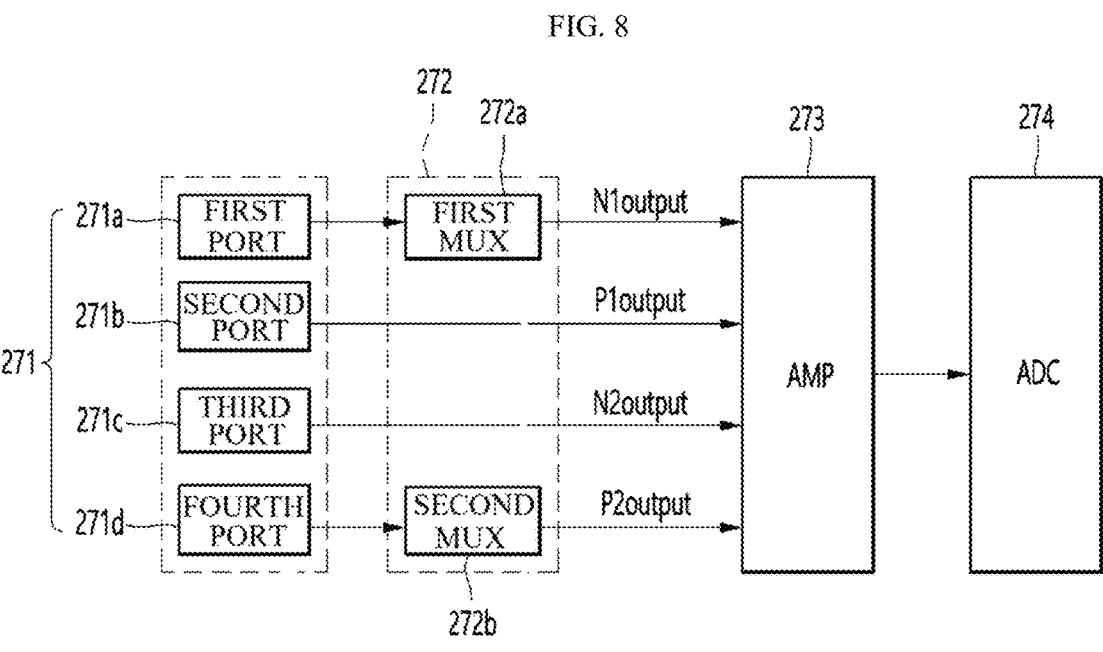
FIG. 8 is a block diagram showing a detailed configuration of a control unit of a first embodiment.
Figure 9:
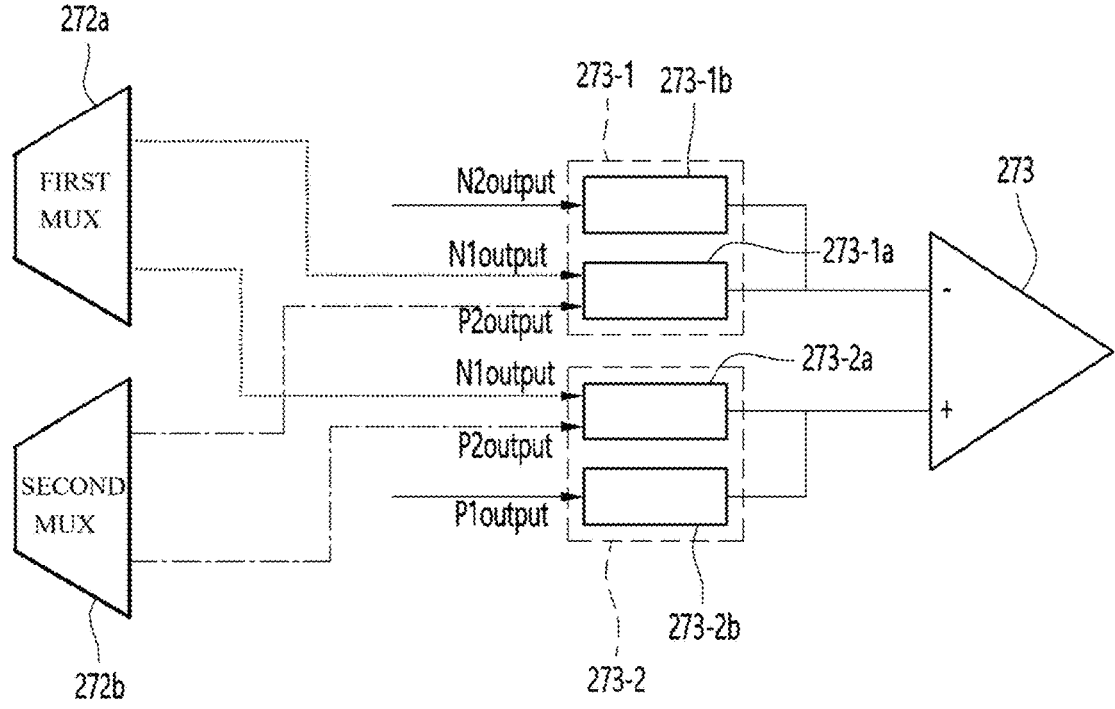
FIG. 9 is a view explaining a connection relationship between a multiplexer and an amplifier of the control unit of FIG. 8.
Figure 10:
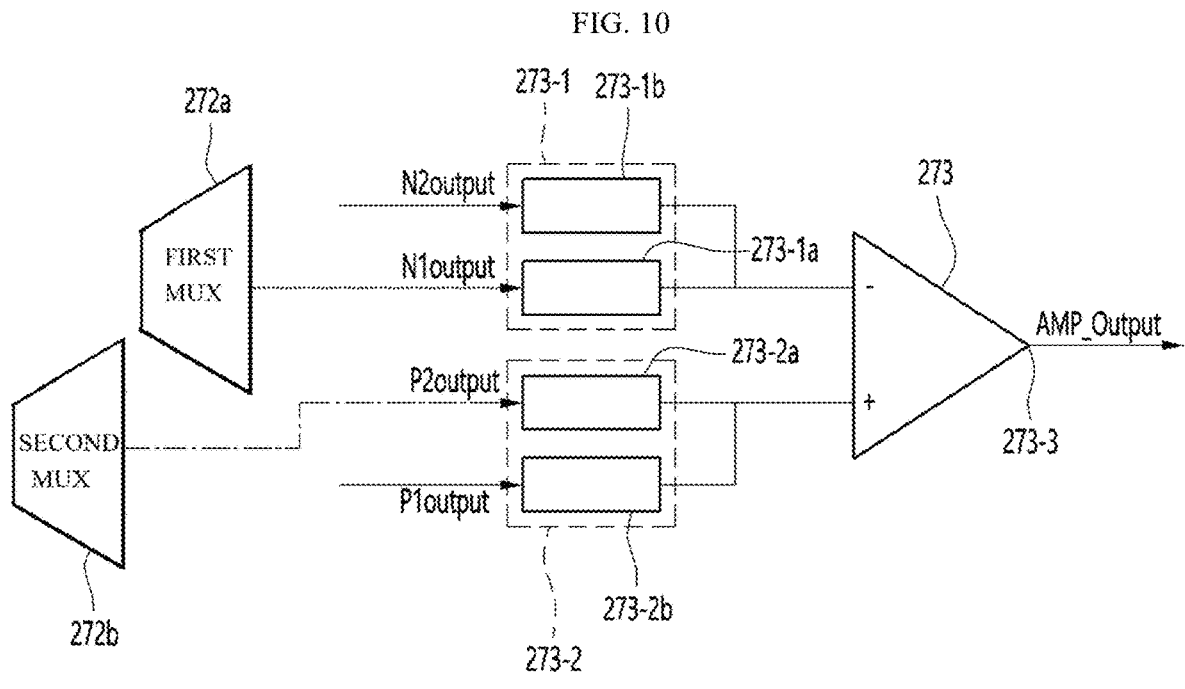
FIG. 10 is a view explaining a switching state of a multiplexer and an input signal of an amplifier in a first condition.
Figure 11:
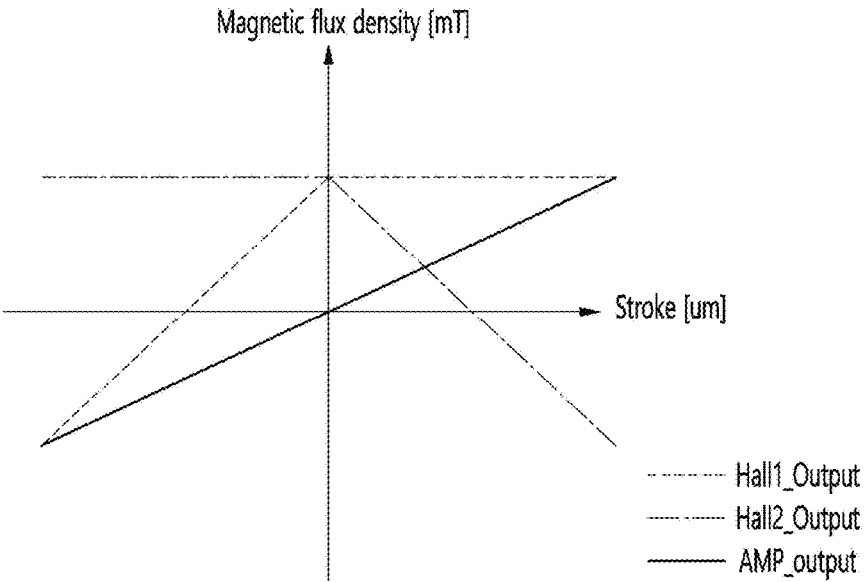
FIG. 11 is a view explaining an output signal of an amplifier of FIG. 10.

FIG. 8 is a block diagram showing a detailed configuration of a control unit of a first embodiment, FIG. 9 is a view explaining a connection relationship between a multiplexer and an amplifier of the control unit of FIG. 8, FIG. 10 is a view explaining a switching state of a multiplexer and an input signal of an amplifier in a first condition, FIG. 11 is a view explaining an output signal of an amplifier of FIG. 10, FIG. 12 is a view explaining a switching state of a multiplexer and an input signal of an amplifier in a second condition, and FIG. 13 is a view explaining an output signal of an amplifier of FIG. 12.

Referring to FIG. 8 and FIG. 9, the control unit 270 may include a port unit 271, a multiplexer 272, an amplifier (AMP, 273), and an analog-to-digital converter (ADC, 274).

The port unit 271 includes first to fourth ports 271a, 271b, 271c, and 271d which are respectively connected to two output terminals of the first sensor unit 251 and two output terminals of the second sensor unit 252.

A multiplexer 272 may be disposed between the port unit 271 and the amplifier 273.

The multiplexer 272 may be configured in multiples.

The multiplexer 272 in the first embodiment includes two multiplexers. One of the two multiplexers is connected to a port connected to one of the two output terminals of the first sensor unit 251. In addition, any one of the two multiplexers is connected to a port connected to one of the two output terminals of the second sensor unit 252.

The multiplexer 272 may also be referred to as a switching unit. That is, the multiplexer 272 can selectively output the input signal to one of input terminals of the amplifier 273. For example, the amplifier 273 can include an inverting terminal 273-1 and a non-inverting terminal 273-2.

In addition, the multiplexer 272 can selectively output the input signal to one of the inverting terminal 273-1 and the non-inverting terminal 273-2 of the amplifier 273.

To this end, the multiplexer 272 includes a first multiplexer 272a connected to one of the ports connected to the first sensor unit 251 among the first to fourth ports 271a, 271b, 271c, and 271d.

Specifically, the first multiplexer 272a can be connected to the first port 271a. Through this, the first multiplexer 272a can receive the first-first output signal (N1output) output through the first-first output terminal 251c of the first sensor unit 251 through the first port 271a.

In addition, the first multiplexer 272a can transmit the received first-first output signal (N1output) to the amplifier 273. Preferably, the first multiplexer 272a is selectively connected to either the inverting terminal 273-1 or the non-inverting terminal 273-2 of the amplifier 273.

Specifically, the first multiplexer 272a can be connected to the inverting terminal 273-1 of the amplifier 273 under the first condition. Accordingly, the first multiplexer 272a can transmit the first-first output signal (N1output) transmitted from the first port 271a to the inverting terminal 273-1 of the amplifier 273, under the first condition.

In addition, the first multiplexer 272a can be connected to the non-inverting terminal 273-2 of the amplifier 273 under the second condition. Accordingly, the first multiplexer 272a can transmit the first-first output signal (N1output) transmitted from the first port 271a to the non-inverting terminal 273-2 of the amplifier 273, under the second condition.

In addition, the multiplexer 272 includes a second multiplexer 272b connected to one of the first to fourth ports 271a, 271b, 271c, and 271d connected to the second sensor unit 252.

Specifically, the second multiplexer 272b can be connected to the fourth port 271d. Through this, the second multiplexer 272b can receive the second-second output signal (P2output) output through the second-second output terminal 252d of the second sensor unit 252 through the fourth port 271d.

In addition, the second multiplexer 272b can transmit the received second-second output signal (P2output) to the amplifier 273. Preferably, the second multiplexer 272b is selectively connected to one of the inverting terminal 273-1 and the non-inverting terminal 273-2 of the amplifier 273.

Specifically, the second multiplexer 272b can be connected to the non-inverting terminal 273-2 of the amplifier 273 under the first condition. Accordingly, the second multiplexer 272b can transmit the second-second output signal (P2output) transmitted from the fourth port 271d to the non-inverting terminal 273-2 of the amplifier 273, under the first condition.

In addition, the second multiplexer 272b can be connected to the inverting terminal 273-1 of the amplifier 273 under the second condition. Accordingly, the second multiplexer 272b can transmit the second-second output signal (P2output) transmitted from the fourth port 271d to the inverting terminal 273-1 of the amplifier 273, under the second condition.

The amplifier 273 includes an inverting terminal 273-1 and a non-inverting terminal 273-2. In addition, the amplifier 273 can differentially amplify and output a signal input to the inverting terminal 273-1 and a signal input to the non-inverting terminal 273-2.

At this time, the signals output from the first sensor unit 251 and the second sensor unit 252 have a size of several mV. This is significantly different from an input range of the analog-to-digital conversion unit 274 disposed at a rear end of the amplifier 273. Accordingly, the amplifier 273 differentially amplifies and outputs signals input through the inverting terminal 273-1 and the non-inverting terminal 273-2 to generate an output signal corresponding to an input range of the analog-to-digital conversion unit 274.

The analog-to-digital conversion unit 274 receives an analog signal from the amplifier 273, and converts the received analog signal into a digital signal and outputs the converted digital signal accordingly.

Preferably, the analog-to-digital conversion unit 274 receives an analog signal from the amplifier 273 and outputs the analog signal as a multi-bit digital signal. At this time, the output signal of the analog-to-digital conversion unit 274 can be expressed as values of 0 and 1.

At this time, the inverting terminal 273-1 of the amplifier 273 includes a first inverting terminal 273-1*a* and a second inverting terminal 273-1*b*.

The first inverting terminal 273-1*a* is connected to the first multiplexer 272*a* or the second multiplexer 272*b*. For example, the first inverting terminal 273-1*a* is connected to the first multiplexer 272*a* under the first condition. Then, the first-first output signal (N1output) transmitted through the first port 271*a* can be input to the first inverting terminal 273-1*a* of the amplifier 273 under the first condition. In addition, the first inverting terminal 273-1*a* is connected to the second multiplexer 272*b* under the second condition. Then, the second-second output signal (P2output) transmitted through the fourth port 271*d* can be input to the first inverting terminal 273-1*a* of the amplifier 273 under the second condition.

The second inverting terminal 273-1*b* is fixedly connected to any one of the first to fourth ports 271*a*, 271*b*, 271*c*, and 271*d* of the port unit 271. For example, the second inverting terminal 273-1*b* in the first embodiment is fixedly connected to any one of the first to fourth ports 271*a*, 271*b*, 271*c*, and 271*d*. Specifically, the second inverting terminal 273-1*b* in the first embodiment is fixedly connected to the third port 271*c*. The second inverting terminal 273-1*b* is connected to the third port 271*c* in both the first condition and the second condition. Accordingly, the second-first output signal (N2output) transmitted through the third port 271*c* can be input to the second inverting terminal 273-1*b*.

Meanwhile, the amplifier 273 can include a first adder (not shown). That is, the inverting terminal 273-1 can include a first adder. Accordingly, a signal obtained by adding a signal input to the first inverting terminal 273-1*a* and a signal input to the second inverting terminal 273-1*b* can be input to the inverting terminal 273-1 of the amplifier 273.

In addition, the non-inverting terminal 273-2 of the amplifier 273 includes a first non-inverting terminal 273-2*a* and a second non-inverting terminal 273-2*b*.

The first non-inverting terminal 273-2*a* is connected to the first multiplexer 272*a* or the second multiplexer 272*b*. For example, the first non-inverting terminal 273-2*a* is connected to the second multiplexer 272*b* under the first condition. In addition, the second-second output signal (P2output) transmitted through the fourth port 271*d* can be input to the first non-inverting terminal 273-2*a* of the amplifier 273, under the first condition. In addition, the first non-inverting terminal 273-2*a* is connected to the first multiplexer 272*a* under the second condition. In addition, the first non-inverting terminal 273-2*a* of the amplifier 273 can input the first-first output signal (N1output) transmitted through the first port 271*a* under the second condition.

The second non-inverting terminal 273-2*b* is fixedly connected to any one of the first to fourth ports 271*a*, 271*b*, 271*c*, and 271*d* of the port unit 271. For example, the second non-inverting terminal 273-2*b* in the first embodiment is fixedly connected to any one of the first to fourth ports 271*a*,

271*b*, 271*c*, and 271*d*. Specifically, the second non-inverting terminal 273-2*b* in the first embodiment is fixedly connected to the second port 271*b*. The second non-inverting terminal 273-2*b* is connected to the second port 271*b* in both the first condition and the second condition. Accordingly, the first-second output signal (P1output) transmitted through the second port 271*b* can be input to the second non-inverting terminal 273-2*b*.

Meanwhile, the amplifier 273 can include a second adder (not shown). That is, the non-inverting terminal 273-2 can include a second adder. Accordingly, a signal obtained by adding a signal input to the first non-inverting terminal 273-2*a* and a signal input to the second non-inverting terminal 273-2*b* can be input to the non-inverting terminal 273-2 of the amplifier 273.

As described above, the camera module of the first embodiment includes a first multiplexer 272*a* and a second multiplexer 272*b*. Through this, one output signal among a plurality of output signals of the first sensor unit 251 and the second sensor unit 252 can be selectively connected to the first inverting terminal 273-1*a* and the first non-inverting terminal 273-2*a* of the amplifier 273.

In addition, the amplifier 273 outputs a first differential amplification signal that differentially amplifies a signal input to the inverting terminal 273-1 and a signal input to the non-inverting terminal 273-2 under a first condition. In addition, the amplifier 273 outputs a second differential amplification signal that differentially amplifies a signal input to the inverting terminal 273-1 and a signal input to the non-inverting terminal 273-2 under a second condition.

The first condition and the second condition may be determined according to the usage environment of the camera module. For example, the form of noise (e.g., common mode noise) transmitted to the camera module may vary depending on the usage location of the camera module or the surrounding structures. In addition, the embodiment determines one of the first condition and the second condition based on the current usage environment so as to improve the position detection accuracy of the lens barrel 120.

Referring to FIGS. 10 and 11, in the first condition, the first multiplexer 272*a* is connected to the first inverting terminal 273-1*a* of the amplifier 273. In addition, in the first condition, the second multiplexer 272*b* is connected to the first non-inverting terminal 273-2*a* of the amplifier 273. That is, the amplifier 273 can differentially amplify the subtraction value of the output signals of the first sensor unit 251 and the second sensor unit 252 in the first condition. Therefore, the first differential amplification signal (AMP_output) in FIG. 11 may be a signal that amplifies the difference value between the first addition value input to the inverting terminal 273-1 and the second addition value input to the non-inverting terminal 272-2 in the first condition. The first addition value is an output value of the first adder (not shown) of the amplifier 273, and the second addition value is an output value of the second adder (not shown). In the first condition, the first addition value means an addition value of the first-first output signal (N1output) of the first sensor unit 251 and the second-first output signal (N2output) of the second sensor unit 252. In addition, in the first condition, the second addition value means the addition value of the first-second output signal (P1output) of the first sensor unit 251 and the second-second output signal (P2output) of the second sensor unit 252. In addition, the first differential amplification signal (AMP_output) in the first condition may mean ½ (for example, (Hall1_output−Hall2_output)/2) of the subtraction value of the first detection signal (Hall1_output) obtained through the multiple output signals of the first sensor unit 251 and the second detection signal (Hall2_output) obtained through the multiple output signals of the second sensor unit 252.

Referring to FIG. 12 and FIG. 13, in the second condition, the first multiplexer 272$a$ is connected to the first non-inverting terminal 273-2$a$ of the amplifier 273. In addition, in the second condition, the second multiplexer 272$b$ is connected to the first inverting terminal 273-1$a$ of the amplifier 273. That is, the amplifier 273 may be a signal that amplifies the difference value between the first addition value input to the inverting terminal 273-1 in the second condition and the second addition value input to the non-inverting terminal 272-2. The first addition value is an output value of the first adder (not shown) of the amplifier 273, and the second addition value is an output value of the second adder (not shown). In the second condition, the first addition value means an addition value of the second-first output signal (N2output) and the second-second output signal (P2output) of the second sensor unit 251. In addition, in the second condition, the second addition value means the addition value of the first-first output signal (N1output) of the first sensor unit 251 and the first-second output signal (P1output) of the first sensor unit 251. In addition, second differential amplification signal (AMP_output) in the second condition may mean ½ (for example, (Hall1_output+Hall2_output)/2) of the addition value of the first detection signal (Hall1_output) obtained through the multiple output signals of the first sensor unit 251 and the second detection signal (Hall2_output) obtained through the multiple output signals of the second sensor unit 252.

That is, in the embodiment, the first multiplexer 272$a$ and the second multiplexer 272$b$ are controlled according to the usage environment of the camera module. Accordingly, different signals can be input to the inverting terminal 273-1 and the non-inverting terminal 273-2 of the amplifier 273 depending on the conditions. In addition, the amplifier 273 can generate an output signal that differentially amplifies the subtraction value of the output signals of the first sensor unit 251 and the second sensor unit 252 under the first condition. In addition, the amplifier 273 can generate an output signal that differentially amplifies the addition value of the output signals of the first sensor unit 251 and the second sensor unit 252 under the second condition. Therefore, the embodiment can generate a differential amplification signal that is robust to noise. Accordingly, the embodiment can improve the position detection accuracy of the lens module.

FIG. 14 is a block diagram showing a detailed configuration of a control unit of a second embodiment, and FIG. 15 is a view for explaining a connection relationship between a multiplexer and an amplifier of a control unit of FIG. 14.

Hereinafter, only the parts that are different from the first embodiment in the configuration of the second embodiment will be described.

The control unit of the first embodiment includes only two multiplexers. Accordingly, one of the two inverting terminals of the amplifier 273 of the first embodiment is connected to one of the two multiplexers, and other one of the two inverting terminals of the amplifier 273 of the first embodiment is fixedly connected to one of the first to fourth ports 271$a$, 271$b$, 271$c$, and 271$d$. In addition, one of the two non-inverting terminals of the amplifier 273 of the first embodiment is connected to the other one of the two multiplexers, and the other one of the two inverting terminals of the amplifier 273 of the first embodiment is fixedly connected to the other one of the first to fourth ports 271$a$, 271$b$, 271$c$, and 271$d$.

The control unit 270 of the second embodiment may include four multiplexers.

That is, the control unit 270 includes the first multiplexer 272$a$ and the second multiplexer 272$b$ that are the same as those of the first embodiment.

In addition, the control unit 270 may further include a third multiplexer 272$c$ and a fourth multiplexer 272$d$.

The third multiplexer 272$c$ may be connected to the second port 271$b$. Through this, the third multiplexer 272$c$ can receive the first-second output signal (P1output) output through the first-second output terminal 251$d$ of the first sensor unit 251 through the second port 271$b$.

In addition, the third multiplexer 272$c$ can transmit the received first-second output signal (P1output) to the amplifier 273. Preferably, the third multiplexer 272$c$ is selectively connected to one of the inverting terminal 273-1 and the non-inverting terminal 273-2 of the amplifier 273. However, the embodiment is not limited thereto. For example, the third multiplexer 272$c$ may be fixedly connected to the second non-inverting terminal 273-2$b$ of the amplifier 273.

In addition, the fourth multiplexer 272$d$ may be connected to the third port 271$c$. Through this, the fourth multiplexer 272$d$ may receive the second-first output signal (N2output) output through the second-first output terminal 251$c$ of the second sensor unit 252 through the third port 271$c$.

In addition, the fourth multiplexer 272$d$ may transmit the received second-first output signal (N2output) to the amplifier 273. Preferably, the fourth multiplexer 272$d$ is selectively connected to one of the inverting terminal 273-1 and the non-inverting terminal 273-2 of the amplifier 273. However, the embodiment is not limited thereto. For example, the fourth multiplexer 272$d$ may be fixedly connected to the second inverting terminal 273-1$b$ of the amplifier 273.

The control unit 270 of the second embodiment includes four multiplexers, and the four multiplexers can selectively output each of the two output signals of the first sensor unit 251 and the two output signals of the second sensor unit 252, which are input through the first to fourth ports 271$a$, 271$b$, 271$c$, and 271$d$, to one of the two inverting terminals 273-1 and the two non-inverting terminals 273-2 of the amplifier 273. Through this, the second embodiment can differentially amplify the subtraction value of the output signals of the first sensor unit 251 and the second sensor unit 252 under a first condition, can differentially amplify an addition value of the output signals of the first sensor unit 251 and the second sensor unit 252 under a second condition, can differentially amplify the subtraction value of the output signals of the first sensor unit 251 under a third condition, and can differentially amplify the subtraction value of the output signals of the second sensor unit 252 under a fourth condition.

An embodiment as described above includes a plurality of sensor units. The plurality of sensor units may be position detection sensors detecting the position of the lens module. The embodiment detects a position of the lens module using the plurality of sensor units. Through this, the embodiment can expand a detection range in response to a long stroke of the lens module. Accordingly, the embodiment can improve the position detection accuracy of the lens module. Through this, the embodiment can improve the control accuracy of the lens module. Therefore, the embodiment can improve the operation reliability of the camera module.

In addition, each of the plurality of sensor units includes a plurality of output terminals. In addition, the plurality of output terminals are not directly connected to each other. Specifically, the plurality of output terminals are individually connected to different ports of the control unit.

Therefore, the embodiment can apply an optimal position detection condition according to an usage environment of the camera module.

Specifically, the embodiment can detect a position of the lens module using a first differential amplification signal that differentially amplifies a subtraction value of the output signals of the first sensor unit and the output signals of the second sensor unit under a first condition. In addition, the embodiment can detect a position of the lens module using a second differential amplification signal that differentially amplifies the addition value of the output signals of the first sensor unit and the output signals of the second sensor unit under a second condition. In addition, the embodiment can detect a position of the lens module using a third differential amplification signal that differentially amplifies a subtraction value of the output signals of the first sensor unit under the third condition. In addition, the embodiment can detect a position of the lens module using a fourth differential amplification signal that differentially amplifies a subtraction value of the output signals of the second sensor unit under a fourth condition.

At this time, a condition may be determined according to the usage environment of the camera module. For example, a form of noise (e.g., common mode noise) transmitted to the camera module may vary depending on an usage location of the camera module or surrounding structures. In addition, the embodiment can determine one of the first condition and the second condition based on an current usage environment to provide a detection signal that is strong against noise. Accordingly, the embodiment can improve the position detection accuracy of the lens barrel.

In addition, the embodiment can simplify a process of manufacturing the camera module without forming a connection line on a circuit board for directly connecting a plurality of sensor units to each other. Furthermore, the embodiment can improve the product yield.

FIG. 16 is a perspective view of an optical device according to an embodiment, and FIG. 17 is a configuration diagram of the optical device illustrated in FIG. 16.

Referring to FIGS. 16 and 17, an optical device may be a portable terminal. Hereinafter, an optical device is referred to as a terminal 200A.

A terminal may include a body 850, a wireless communication unit 710, an A/V input unit 720, a sensing unit 740, an input/output unit 750, a memory unit 760, an interface unit 770, a control unit 780, and a power supply unit 790.

The body 850 shown in FIG. 16 is in the form of a bar, but is not limited thereto, and there may be various structures such as a slide type, a folder type, a swing type, a swivel type, in which two or more sub-bodies are coupled to be movable relative to each other.

The body 850 may include a case (casing, housing, cover, etc.) forming an exterior. For example, the body 850 may be divided into a front case 851 and a rear case 852. Various electronic components of the terminal may be embedded in a space formed between the front case 851 and the rear case 852.

The wireless communication unit 710 may include one or more modules that enable wireless communication between the terminal 200A and the wireless communication system or between the terminal 200A and the network in which the terminal 200A is located. For example, the wireless communication unit 710 may include a broadcast reception module 711, a mobile communication module 712, a wireless internet module 713, a short-range communication module 714, and a location information module 715.

The A/V (Audio/Video) input unit 720 is for inputting an audio signal or a video signal, and may include a camera 721 and a microphone 722 and the like.

The camera 721 may include a camera module according to the embodiment shown in FIG. 1.

The sensing unit may detect a current state of the terminal 200A, such as an opening/closing state of the terminal 200A, a position of the terminal 200A, a presence or absence of user contact, an orientation of the terminal 200A, acceleration/deceleration of the terminal 200A, etc. In addition, generate a sensing signal for controlling the operation of the terminal 200A. For example, when the terminal 200A is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The input/output unit 750 is for generating input or output related to sight, hearing, or touch. The input/output unit 750 may generate input data for operation control of the terminal 200A, and may also display information processed by the terminal 200A.

The input/output unit 750 may include a keypad unit 730, a display module 751, a sound output module 752, and a touch screen panel 753. The keypad unit 730 may generate input data in response to a keypad input.

The display module 751 may include a plurality of pixels whose color changes according to an electrical signal. For example, the display module 751 may include at least of a liquid crystal display, a thin film transistor-liquid crystal display, an organic light-emitting diode, a flexible display, three-dimensional display (3D display).

The sound output module 752 may output audio data received from the wireless communication unit 710 in a call signal reception, a call mode, a recording mode, a voice recognition mode, or a broadcast reception mode, or the like; or audio data stored in the memory unit 760.

The touch screen panel 753 may convert a change in capacitance generated due to a user's touch on a specific region of the touch screen into an electrical input signal.

The memory unit 760 may store a program for processing and control of the controller 780, and may temporarily store input/output data (e.g., phone book, message, audio, still image, photo, video, etc.). For example, the memory unit 760 may store an image captured by the camera 721, for example, a photo or a moving picture.

The interface unit 770 serves as a passage for connecting with an external device connected to the terminal 200A. The interface unit 770 receives data from an external device, receives power and transmits it to each component inside the terminal 200A, or transmits data of the terminal 200A to an external device. For example, the interface unit 770 may include a wired/wireless headset port, an external charger port, a wired/wireless data port, a memory card port, a port for connecting a device having an identification module, and an audio I/O (Input/Output) port, video I/O (Input/Output) port, and an earphone port, and the like.

The controller (controller, 780) may control the overall operation of the terminal 200A. For example, the controller 780 may perform related control and processing for voice calls, data communications, video calls, and the like.

The controller 780 may include a multimedia module 781 for playing multimedia. The multimedia module 781 may be implemented within the controller 180 or may be implemented separately from the controller 780.

The controller 780 may perform a pattern recognition process capable of recognizing a handwriting input or a drawing input performed on the touch screen as characters and images, respectively.

The power supply unit 790 may receive external power or internal power under the control of the control unit 780 to supply power required for the operation of each component.

Although the embodiments of the present invention have been described with reference to the accompanying drawings, those skilled in the art to which the present invention pertains will be understood that the present invention may be implemented in other specific forms without modifying the technical spirit and essential features of the present invention. Therefore, it should be understood that the embodiments described above are illustrative in all aspects and not restrictive.

The invention claimed is:

1. A camera module comprising:
a position sensor unit including a first sensor unit and a second sensor unit; and
a control unit connected to the first and second sensor units and configured to obtain position information based on a plurality of output signals of the first and second sensor units,
wherein the first sensor unit includes a plurality of first input terminals and a plurality of first output terminals,
wherein the second sensor unit includes a plurality of second input terminals and a plurality of second output terminals,
wherein the control unit includes a port unit including a plurality of ports connected to each of the plurality of first output terminals and the plurality of second output terminals, and
wherein the control unit is connected to both the plurality of first output terminals and the plurality of second output terminals through the port unit and configured to obtain the position information through a selective operation based on the plurality of output signals of the first and second sensor units received through the plurality of first output terminals and the plurality of second output terminals.

2. The camera module of claim 1, wherein the plurality of first output terminals of the first sensor unit include a first-first output terminal outputting a first-first output signal having a first polarity, and a first-second output terminal outputting a first-second output signal having a second polarity opposite to the first polarity, and
wherein the plurality of second output terminals of the second sensor unit include a second-first output terminal outputting a second-first output signal having the first polarity, and a second-second output terminal outputting a second-second output signal having the second polarity.

3. The camera module of claim 2,
wherein the port unit includes:
a first port connected to the first-first output terminal and receiving the first-first output signal,
a second port connected to the first-second output terminal and receiving the first-second output signal,
a third port connected to the second-first output terminal and receiving the second-first output signal, and
a fourth port connected to the second-second output terminal and receiving the second-second output signal.

4. The camera module of claim 3, wherein the control unit includes:

a multiplexer connected to the port unit and configured to switch the plurality of output signals received through the connected ports;
an amplifier configured to receive the plurality of output signals of the first and second sensor units through one of the port unit and the multiplexer, and to differentially amplify at least one of the received plurality of output signals; and
an analog-to-digital converter connected to the amplifier and configured to convert an output signal of the amplifier into a digital signal.

5. The camera module of claim 4, wherein the amplifier includes an inverting terminal and a non-inverting terminal configured to receive a plurality of output signals of the first and second sensor units,
wherein the inverting terminal includes first and second inverting terminals, and
wherein the non-inverting terminal includes first and second non-inverting terminals, and
wherein the amplifier is configured to differentially amplify a first addition value obtained by adding signals received through the first and second inverting terminals and a second addition value obtained by adding signals received through the first and second non-inverting terminals.

6. The camera module of claim 5, wherein the multiplexer includes:
a first multiplexer connected to the first port and configured to switch the first-first output signal received through the first port to one of the first inverting terminal and the first non-inverting terminal of the amplifier; and
a second multiplexer connected to the first port and configured to switch the second-second output signal received through the fourth port to any one of the first inverting terminal and the first non-inverting terminal of the amplifier.

7. The camera module of claim 6, wherein the second inverting terminal of the amplifier is connected to the third port and receives the second-first output signal, and
wherein the second non-inverting terminal of the amplifier is connected to the second port and receives the first-second output signal.

8. The camera module of claim 7, wherein
the first multiplexer and the second multiplexer output different signals to the amplifier according to preset conditions.

9. The camera module of claim 8, wherein the preset conditions include a first condition,
wherein, in the first condition, the first multiplexer outputs the first-first output signal to the first inverting terminal of the amplifier, and the second multiplexer outputs the second-second output signal to the first non-inverting terminal of the amplifier.

10. The camera module of claim 9, wherein the preset conditions include a second condition different from the first condition, and
wherein, in the second condition, the first multiplexer outputs the first-first output signal to the first non-inverting terminal of the amplifier, and the second multiplexer outputs the second-second output signal to the first inverting terminal of the amplifier.

11. The camera module of claim 10, wherein the amplifier amplifies a difference value between the first addition value and the second addition value and outputs the difference value.

12. The camera module of claim 11, wherein, in the first condition, the first addition value is an addition value of the first-first output signal and the second-first output signal, and the second addition value is an addition value of the first-second output signal and the second-second output signal.

13. The camera module of claim 12, wherein, in the second condition, the first addition value is an addition value of the second-first output signal and the second-second output signal, and the second addition value is an addition value of the first-first output signal and the first-second output signal.

14. The camera module of claim 6, wherein the multiplexer includes:

a third multiplexer connected to the third port and configured to switch the second-first output signal received through the third port to the second inverting terminal of the amplifier; and a fourth multiplexer connected to the second port and configured to switch the first-second output signal received through the second port to the second non-inverting terminal of the amplifier.

15. A camera module comprising:

a position sensor unit including a first sensor unit and a second sensor unit; and a control unit connected to the first and second sensor units and configured to obtain position information based on a plurality of output signals of the first and second sensor units, wherein the first sensor unit includes a plurality of first input terminals and a plurality of first output terminals, wherein the second sensor unit includes a plurality of second input terminals and a plurality of second output terminals, wherein the control unit includes:

a port unit including a plurality of ports connected to each of the plurality of first output terminals and the plurality of second output terminals, a multiplexer connected to the port unit and configured to switch the plurality of output signals received through the connected ports;

an amplifier configured to receive the plurality of output signals of the first and second sensor units through one of the port unit and the multiplexer, and to differentially amplify at least one of the received plurality of output signals; and an analog-to-digital converter connected to the amplifier and configured to convert an output signal of the amplifier into a digital signal.

16. The camera module of claim 15, wherein the plurality of first output terminals of the first sensor unit include a first-first output terminal outputting a first-first output signal having a first polarity, and a first-second output terminal outputting a first-second output signal having a second polarity opposite to the first polarity, and wherein the plurality of second output terminals of the second sensor unit include a second-first output terminal outputting a second-first output signal having the first polarity, and a second-second output terminal outputting a second-second output signal having the second polarity.

17. The camera module of claim 16, wherein the port unit includes:

a first port connected to the first-first output terminal and receiving the first-first output signal, a second port connected to the first-second output terminal and receiving the first-second output signal, a third port connected to the second-first output terminal and receiving the second-first output signal, and a fourth port connected to the second-second output terminal and receiving the second-second output signal.

18. The camera module of claim 17, wherein the amplifier includes an inverting terminal and a non-inverting terminal configured to receive a plurality of output signals of the first and second sensor units, wherein the inverting terminal includes first and second inverting terminals, and wherein the non-inverting terminal includes first and second non-inverting terminals, and wherein the amplifier is configured to differentially amplify a first addition value obtained by adding signals received through the first and second inverting terminals and a second addition value obtained by adding signals received through the first and second non-inverting terminals.

19. The camera module of claim 18, wherein the multiplexer includes:

a first multiplexer connected to the first port and configured to switch the first-first output signal received through the first port to one of the first inverting terminal and the first non-inverting terminal of the amplifier; and a second multiplexer connected to the first port and configured to switch the second-second output signal received through the fourth port to any one of the first inverting terminal and the first non-inverting terminal of the amplifier.

20. The camera module of claim 19, wherein, in a first condition, the first multiplexer outputs the first-first output signal to the first inverting terminal of the amplifier, and the second multiplexer outputs the second-second output signal to the first non-inverting terminal of the amplifier, and wherein in a second condition different from the first condition, the first multiplexer outputs the first-first output signal to the first non-inverting terminal of the amplifier, and the second multiplexer outputs the second-second output signal to the first inverting terminal of the amplifier.

* * * * *